(12) United States Patent
Bartnik Johansson et al.

(10) Patent No.: US 12,546,114 B2
(45) Date of Patent: Feb. 10, 2026

(54) ROOFING SYSTEM AND INSULATION ELEMENT FOR A FLAT ROOF OR A FLAT INCLINED ROOF

(71) Applicant: ROCKWOOL A/S, Hedehusene (DK)

(72) Inventors: Dorte Bartnik Johansson, Hedehusene (DK); Miroslav Nikolic, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 693 days.

(21) Appl. No.: 17/916,461

(22) PCT Filed: Apr. 3, 2020

(86) PCT No.: PCT/EP2020/059619
§ 371 (c)(1),
(2) Date: Sep. 30, 2022

(87) PCT Pub. No.: WO2021/197623
PCT Pub. Date: Oct. 7, 2021

(65) Prior Publication Data
US 2023/0141991 A1    May 11, 2023

(51) Int. Cl.
*E04D 13/16* (2006.01)
*D04H 1/4218* (2012.01)
*D04H 1/587* (2012.01)
*D04H 1/64* (2012.01)

(52) U.S. Cl.
CPC ........... *E04D 13/16* (2013.01); *D04H 1/4218* (2013.01); *D04H 1/587* (2013.01); *D04H 1/64* (2013.01)

(58) Field of Classification Search
CPC ..... C08H 6/00; C09J 197/005; D04H 1/4218; D04H 1/587; D04H 1/64; D04H 1/4209; E04D 13/16; Y02W 30/91
See application file for complete search history.

(56) References Cited

U.S. PATENT DOCUMENTS

| | | | |
|---|---|---|---|
| 6,238,475 B1 | 5/2001 | Gargulak et al. | |
| 6,706,853 B1 | 3/2004 | Stanssens et al. | |
| 8,623,234 B2 | 1/2014 | Jaffrennou et al. | |
| 2003/0042344 A1 | 3/2003 | Fisch et al. | |
| 2019/0338168 A1 | 11/2019 | Laine et al. | |
| 2024/0217875 A1* | 7/2024 | Johansson | D04H 1/60 |

FOREIGN PATENT DOCUMENTS

| | | |
|---|---|---|
| CN | 107286873 A | 10/2017 |
| CN | 110799468 A | 2/2020 |
| DE | 102004047193 A1 | 9/2005 |
| WO | 9304242 A1 | 3/1993 |
| WO | 98031895 A1 | 7/1998 |
| WO | 2008155401 A1 | 12/2008 |
| WO | 2012172262 A1 | 12/2012 |
| WO | 2013034376 A1 | 3/2013 |
| WO | 2018/206133 A1 | 11/2018 |
| WO | 2018206132 A1 | 11/2018 |

OTHER PUBLICATIONS

Masoumeh Ghorbani et al: "Ammoxidized Fenton-Activated Pine Kraft Lignin Accelerates Synthesis and Curing of Resole Resins", Polymers, vol. 9, No. 12, Jan. 28, 2017 (Jan. 28, 2017), p. 43, XP055574267, vol. 9, No. 12, Jan. 28, 2017 (Jan. 28, 2017), p. 43, XP055574267, DOI: 10.3390/polym9020043.
International Search Report and Written Opinion of the ISA issued in PCT/EP2020/059619, mailed Dec. 7, 2020; ISA/EP.

* cited by examiner

*Primary Examiner* — Anthony J Green

(74) *Attorney, Agent, or Firm* — Harness, Dickey & Pierce, P.L.C.

(57) ABSTRACT

The disclosure relates to a roofing system for a flat roof or a flat inclined roof of a building with a thermal and/or acoustic insulation, consisting of a structural support, a deck, optionally a vapour control layer, a waterproof membrane and at least one insulation element being a bonded mineral fibre product made of mineral fibres, preferably stone wool fibres, and a cured aqueous binder, whereby the cured aqueous binder prior to curing comprises a component (i) in form of one or more oxidized lignins, a component (ii) in form of one or more cross-linkers, a component (iii) in form of one or more plasticizers, and whereby the insulation element has a bulk density between 70 kg/m³ and 250 kg/m³.

19 Claims, 10 Drawing Sheets

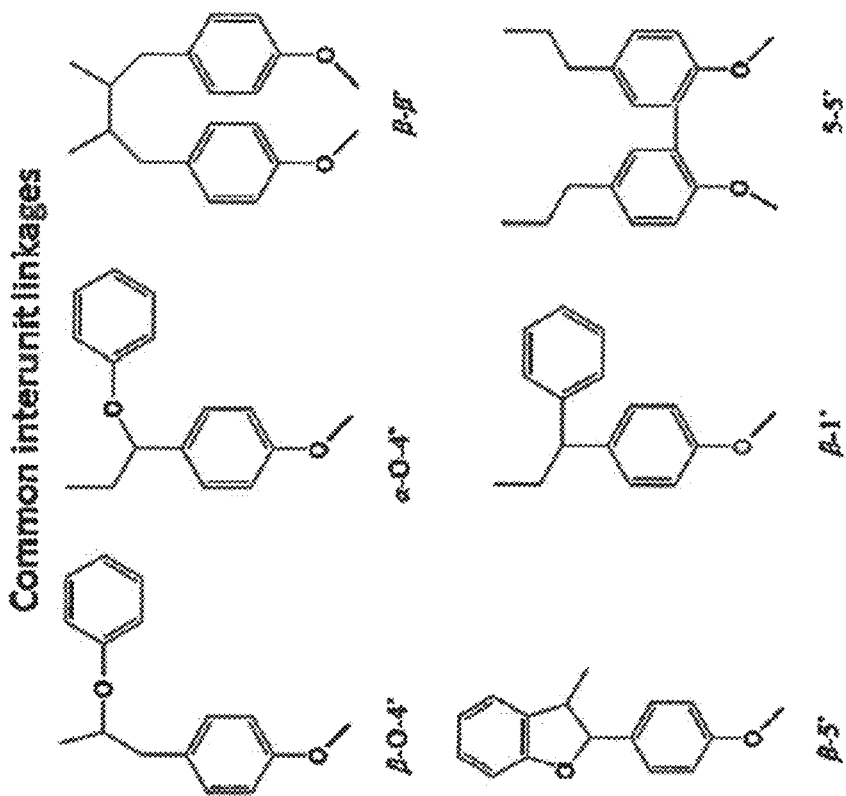
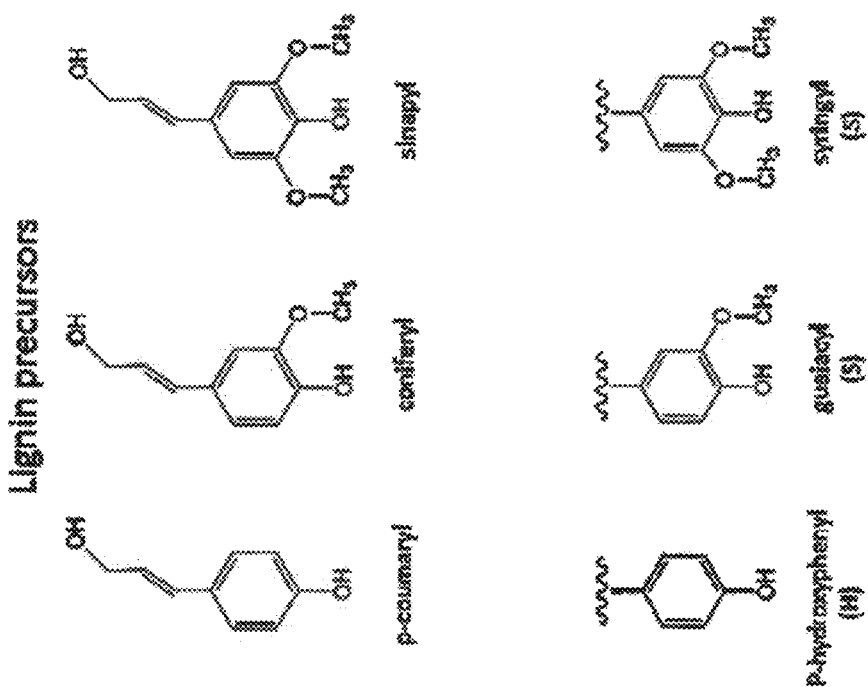
Fig. 8

Fig. 10

Properties of technical lignins

| Lignin Type | Sulfur Lignins | | Sulfur-free lignins | |
| --- | --- | --- | --- | --- |
| | Kraft | Lignosulfate | Soda | Organosolv |
| Raw materials | Softwood Hardwood | Softwood Hardwood | Annual plants | Softwood Hardwood Annual Plants |
| Solubility | Alkali Organic solvents | Water | Alkali | Wide range of organic solvents |
| Number-average molar mass ($M_n$-gmol$^{-1}$) | 1000-3000 | 15,000-50,000 | 800-3000 | 500-5000 |
| Polydispersity | 2.5-3.5 | 6-8 | 2.5-3.5 | 1.5-2.5 |
| $T_g$(°C) | 140-150 | 130 | 140 | 90-110 |

ROOFING SYSTEM AND INSULATION ELEMENT FOR A FLAT ROOF OR A FLAT INCLINED ROOF

CROSS-REFERENCE TO RELATED APPLICATIONS

This application is a U.S. National Phase Application under 35 U.S.C. 371 of International Application No. PCT/EP2020/059619, filed on Apr. 3, 2020. The entire disclosure of the above application is incorporated herein by reference.

FIELD

The present disclosure relates to a roofing system for a flat roof or a flat inclined roof of a building with a thermal and/or acoustic insulation, consisting of a structural support, a deck, optionally a vapour control layer, a waterproof membrane and at least one insulation element being a bonded mineral fibre product made of mineral fibres, preferably stone wool fibres, and a binder. Furthermore, the present disclosure relates to an Insulation element for such a roofing system, made of mineral fibres, preferably stone wool fibres, and a binder.

BACKGROUND

This section provides background information related to the present disclosure which is not necessarily prior art.

Flat roofs and flat inclined roofs are well known in the prior art, e.g. as membrane roof systems which are generally divided into the following types, according to the position in which the principal thermal insulation is placed: warm roofs, inverted warm roofs, roof gardens or green roofs, and cold roofs.

Membrane roof systems nowadays are often built as single ply roofing systems that are used to protect flat roofs or flat inclined roofs from all weather conditions likely to be experienced during their design life.

A typical single ply roof system comprises: a structural support, a deck providing continuous support, a vapour control layer (if required), thermal insulation, a waterproof membrane and a traffic or load resistant finish (if required for functional and/or aesthetic reasons).

Most flat roofs and flat inclined roofs these days are designed as so-called warm roofs. In such warm roofs the principal thermal insulation is placed immediately below the roof covering, namely the waterproof membrane. This keeps the deck warm during cold weather and manages condensation without the need for ventilation. A vapour control layer optionally is laid over the deck to control water vapour entering the insulation. This is a very reliable and cost-effective way to insulate a membrane roof to a high standard.

The three principal options for attachment of single ply roofing systems are mechanical fastening, adhesion/cold gluing, ballast whereby the insulation and the membrane may be either attached by the same or a different method.

Various systems described in the prior art are useful for roofing systems for flat or flat inclined roofs of buildings, and making use of insulation elements of bonded mineral fibre products.

In certain instances it is also known to use layers of mineral fibres, for instance glass fibres, as a non-woven fleece or tissue across the insulation elements whereby it is sandwiched between the insulation elements and the waterproof membrane. A panel formed of several insulation elements arranged side-by-side may have a layer of non-woven fleece or tissue extending across its entire area. The fleece or tissue may be adhered to the element(s) by an adhesive applied between the contacting surfaces. The fleece or tissue holds the board's position in the panel and may improve the mechanical strength by enabling forces exerted on one element to be transferred to the adjacent element. The fleece or tissue has small pores, for instance having an average pore size or distance between adjacent fibres of less than 0,5 mm, for instance as little as 0,1 mm.

State of the art roofing systems make use of tissue and fabric faced or bitumen coated roof boards to provide an adequate surface of the insulation element layer for the gluing/bonding of the waterproof membrane. These systems can be used but may however have the disadvantage that adhesives may disperse into the insulation element layer. Such dispersed adhesive significantly decreases the insulation and/or damping characteristics of said insulation layer. Moreover, dispersed adhesive will result in higher glue consumption and uncontrolled adhesion strength thus causing higher system costs.

Finally, such adhesives which normally are organic adhesives reduce the fire resistance of the insulation elements, in particular in case of bitumen coated roof boards as they are mentioned above.

For example, WO 98/31895 discloses a roofing system comprising a mineral fibre core, a fabric overlying the core and united to the core by a resin to form a panel and a moisture/water impermeable sheet overlying the fabric, which is joined to the panel by an adhesive which penetrates into the mineral fibre core. Although this composite roof system is widely used for flat and flat inclined roofs it has several disadvantages as described before.

Another example of a roofing system is disclosed in WO 2013/034376. This roofing system comprises insulation elements for thermal and/or acoustic insulation comprising two layers, of which at least one layer is made of mineral fibres, especially stone wool fibres, and which second layer is made of at least one fabric and fixed to a major surface of the first layer by an adhesive, whereby the second layer is equipped with a filler, which gives a certain permeability to the second layer.

Because any loads on a warm roof are transferred to the structure through the thermal insulation, a rigid material is required. The choice is important because different products offer different support and require greater or less thickness to achieve a chosen thermal installation value. This must be taken into account while designing and planning of a roofing system for a flat or flat inclined roof of a building.

There are basically two classes of insulation products:
Cellular materials, like e.g. Polyisocyanurate (PIR), Expanded Polystyrene (EPS) or Extruded Polystyrene (XPS);
fibrous materials, like e.g. mineral wool (MW) and in particular stone wool.

The latter mineral wool products are well-known for their excellent thermal and acoustic properties, as well as their mechanical strength and superior fire resistance. Said products are also referred to as bonded mineral fibre products made of mineral fibres and a binder, respective requirements for such products are specified in European Standard EN 13162:2015-04 "Thermal insulation products for buildings—Factory made mineral wool (MW) products".

Mineral fibre or mineral wool products generally comprise man-made vitreous fibres (MMVF). The man-made vitreous fibres (MMVF) can have any suitable oxide composition. Said fibres can be glass fibres, ceramic fibres, basalt fibres, slag fibres or rock or stone fibres. The fibres are preferably of the types generally known as rock, stone or slag fibres, most preferably stone fibres, which are bonded together by a cured thermoset polymeric binder material.

The binder of choice has been phenol-formaldehyde resin which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines.

Another group of non-phenol-formaldehyde binders are the addition/-elimination reaction products of aliphatic and/or aromatic anhydrides with alkanolamines. These binder compositions are water soluble and exhibit excellent binding properties in terms of curing speed and curing density.

Since some of the starting materials used in the production of these binders are rather expensive chemicals, there is an ongoing need to provide formaldehyde-free binders, sometimes also referred to as non-added formaldehyde binders (NAF) which are economically produced.

A further effect in connection with previously known aqueous binder compositions from mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

A further effect in connection with previously known aqueous binder compositions for mineral fibres is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide mineral fibres products using binder compositions with a reduced content of corrosive and/or harmful materials.

In the meantime, a number of binders for mineral fibres products have been provided, which are to a large extend based on renewable starting materials. In many cases these binders based to a large extend on renewable resources are also formaldehyde-free.

However, many of these binders are still comparatively expensive because they are based on comparatively expensive basic materials. Moreover, up to now they don't provide adequate strength properties to the final mineral fibre products over time.

Roofing systems for a flat or flat inclined roof are to be constructed for a lifetime of 30 years and more and thus require durable materials. Since the loads on such roofs are transferred to the structure through the thermal insulation, the bonded mineral fibre products need to be capable of withstanding most of the loading cases, especially pressure loads, like e.g. occasional, light, foot traffic during the construction but in particular for respective inspection purposes during later services, and moreover in respect to all weather conditions and in particular wind loads, likely to be experienced over time. Consequently, mineral fibre products for insulation of roofing systems require a certain robustness which is a matter of density, and which is why such products density typically ranges from e.g. 70 kg/m³ up to around 250 kg/m³ providing certain strength properties, also over time.

Insulation elements of bound mineral fibre products making use of the above-mentioned phenol-formaldehyde resins or urea extended phenol-formaldehyde resins are known to be superior when it comes to loss of strength over time, i.e. due to ageing, and have thus been used for decades. The use of prior art formaldehyde-free or non-added formaldehyde binders (NAF) has proven to be feasible for light-weight products with bulk densities of less than around 60 kg/m³, products that are installed in e.g. cavities or spaces which will subsequently be covered and where there's no need for the products to take-up any loads or provide any specific mechanical resistance. However, these formaldehyde-free binders are seen critical in case of such insulation elements having to withstand loads and mechanical stress for the fact that they are relatively prone to ageing, thus losing their robustness over time.

SUMMARY

This section provides a general summary of the disclosure, and is not a comprehensive disclosure of its full scope or all of its features.

It is therefore an object of the disclosure to provide a roofing system with mineral fibre elements being applicable for such roofing systems and avoiding the use of expensive and/or harmful materials for the binder and/or expensive and/or harmful binders per se.

A further object of the disclosure is to provide mineral fibre elements being applicable for roofing systems without using expensive and/or harmful materials for the binder and/or without using expensive and/or harmful binders per se.

In accordance with the present disclosure the roofing system comprises an insulation element of mineral fibres having a binder comprising a component in form of one or more oxidized lignins, a component in form of one or more cross-linkers, a component in form of one or more plasticizers, and whereby the insulation element has a bulk density of between 70 kg/m³ and 250 kg/m³.

Furthermore, in accordance with the present disclosure the insulation element for the roofing is made of mineral fibres, preferably stone wool fibres, and a binder, whereby the binder comprises a component in form of one or more oxidized lignins, a component in form of one or more cross-linkers, a component in form of one or more plasticizers and whereby the insulation element has a bulk density between 70 kg/m³ and 250 kg/m³.

It has been found that it is possible to obtain an insulation element made of mineral fibres and the binder as mentioned before which provides the necessary mechanical stability to be used in a roofing system for a flat or flat inclined roof whereby the insulation element does not contain a harmful binder and being free of formaldehyde on the one hand and whereby the binder has a high ageing resistance and only a low loss of strength during the lifetime of the roofing system. Furthermore, the amount of binder may be reduced compared to the binders without formaldehyde being used in the prior art, such as e.g. existing NAF binders.

In one embodiment, the insulation element may have any of the preferred features described for the roofing system.

Preferably the insulation element has a loss on ignition (LOI) within the range of 2 to 8 wt.-%, preferably between 2 and 5 wt.-%. The binder content is taken as the LOI and determined according European Standard EN 13820:2003. The binder includes oil and other binder additives.

According to a preferred embodiment the roofing system is provided with insulation elements with a compression strength between 50 and 130 kPa measured in accordance with European Standard EN 826:2013.

According to another embodiment the roofing system is provided with insulation elements with a delamination strength between 20 and 50 kPa measured in accordance with European Standard EN 1607:2013.

Such insulation elements of bonded mineral fibre products are known for their superior fire resistance and are typically, if not otherwise treated or covered with coatings or facings, classified in Euroclass A1 according to European Standard EN 13501-1: 2018.

In a preferred embodiment, the binder used in insulation elements according to the present disclosure being used in roofing systems according to the disclosure are formaldehyde free.

The term "formaldehyde free" is defined to characterize an insulation element made of mineral fibres and a binder where the emission is below 5 µg/m$^2$/h of formaldehyde from the insulation element, preferably below 3 µg/m$^2$/h. Preferably, the test is carried out in accordance with ISO 16000 for testing aldehyde emissions.

Component (i)

As one component (i) the binder comprises one or more oxidized lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

FIG. 7 shows a section from a possible lignin structure.

There are at least four groups of technical lignins available in the market. These four groups are shown in FIG. 9. A possible fifth group, Biorefinery lignin, is a bit different as it is not described by the extraction process, but instead by the process origin, e.g. biorefining and it can thus be similar or different to any of the other groups mentioned. Each group is different from each other and each is suitable for different applications. Lignin is a complex, heterogenous material composed of up to three different phenyl propane monomers, depending on the source. Softwood lignins are made mostly with units of coniferyl alcohol, see FIG. 8 and as a result, they are more homogeneous than hardwood lignins, which has a higher content of syringyl alcohol, see FIG. 8. The appearance and consistency of lignin are quite variable and highly contingent on process.

A summary of the properties of these technical lignins is shown in FIG. 10. Lignosulfonate from the sulfite pulping process remains the largest commercially available source of lignin, with capacity of 1.4 million tons. But taking these aside, the kraft process is currently the most used pulping process and is gradually replacing the sulfite process. An estimated 78 million tons per year of lignin are globally generated by kraft pulp production but most of it is burned for steam and energy. Current capacity for kraft recovery is estimated at 160,000 tons, but sources indicate that current recovery is only about 75,000 tons. Kraft lignin is developed from black liquor, the spent liquor from the sulfate or kraft process. At the moment, three well-known processes are used to produce the kraft lignin: LignoBoost, LignoForce and SLRP. These three processes are similar in that they involve the addition of $CO_2$ to reduce the pH to 9-10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrate remains. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH ~10).

Commercial kraft lignin is generally higher in purity than lignosulfonates. The molecular weight is 1000-3000 g/mol.

Soda lignin originates from sodium hydroxide pulping processes, which are mainly used for wheat straw, bagasse and flax. Soda lignin properties are similar to kraft lignins one in terms of solubility and $T_g$. This process does not utilize sulfur and there is no covalently bound sulfur. The ash level is very low. Soda lignin has a low solubility in neutral and acid media but is completely soluble at pH 12 and higher.

The lignosulfonate process introduces large amount of sulfonate groups making the lignin soluble in water but also in acidic water solutions. Lignosulfonates has up to 8% sulfur as sulfonate, whereas kraft lignin has 1 to 2% sulfur, mostly bonded to the lignin. The molecular weight of lignosulfonate is 15.000 to 50.000 g/mol. This lignin contains more leftover carbohydrates compared to other types and has a higher average molecular weight. The typical hydrophobic core of lignin together with large number of ionized sulfonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low-grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for binder compositions for mineral fibres failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in binder applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted leading to cross-linked structure of lignin, Different lignins will also have other functional groups available that can potentially be used. The existence of these other groups is largely dependent on the way lignin was separated from cellulose and hemicellulose (thiols in kraft lignin, sulfonates in lignosulfonate etc.) depending on the source.

It has been found that by using oxidized lignins, binder compositions for mineral fibres can be prepared which allow excellent properties of the mineral fibre product produced.

In one embodiment, the component (i) is in form of one or more oxidized kraft lignins.

In one embodiment, the component (i) is in form of one or more oxidized soda lignins.

In one embodiment, the component (i) in form of one or more oxidized lignins is in form of one or more ammonia-oxidized lignins. For the purpose of the present disclosure, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) in form of one or more oxidized lignins is having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component in form of one or more oxidized lignins.

In one embodiment, the component (i) in form of one or more oxidized lignins is having an average carboxylic acid group content of more than 1.5 groups per macromolecule of component (i) in form of one or more oxidized lignins, such as more than 2 groups, such as more than 2.5 groups.

It is believed that the carboxylic acid group content of the oxidized lignins play an important role in the surprising advantages of the aqueous binder compositions used for mineral fibres elements according to the present disclosure, In particular, it is believed that the carboxylic acid group of the oxidized lignins improve the cross-linking properties and therefore allow better mechanical properties of the cured mineral fibre products.

Component (ii)

A component (ii) of the binder is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide-cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing crosslinkers can easily be obtained by polymerizing an oxazoline derivative. The patent U.S. Pat. No. 6,818,699 B2 provides a disclosure for such a process.

In one embodiment, the component (ii) is an epoxidized oil based on fatty acid triglyceride.

It is noted that epoxidized oils based on fatty acid triglycerides are not considered hazardous and therefore the use of these compounds in the binder compositions according to the present disclosure do not render these compositions unsafe to handle.

In one embodiment, the component (ii) is a molecule having three or more epoxy groups.

In one embodiment, the component (ii) is one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

In one embodiment, the component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in US 6,706,853 B1.

Without wanting to be bound by any particular theory, it is believed, that the very advantageous properties of the aqueous binder compositions used with the present disclosure are due to the interaction of the oxidized lignins used as component (i) and the cross-linkers mentioned above. It is believed that the presence of carboxylic acid groups in the oxidized lignins enable the very effective cross-linking of the oxidized lignins.

In one embodiment, the component (ii) is one or more cross-linkers selected from the group consisting of multi-functional organic amines such as an alkanolamine, diamines, such as hexamethyldiamine, triamines.

In one embodiment, the component (ii) is one or more cross-linkers selected from the group consisting of polyethylene imine, polyvinyl amine, fatty amines.

In one embodiment, the component (ii) is one or more fatty am ides.

In one embodiment, the component (ii) is one or more cross-linkers selected from the group consisting of dimethoxyethanal, glycolaldehyde, glyoxalic acid.

In one embodiment, the component (ii) is one or more cross-linkers selected from polyester polyols, such as polycaprolactone.

In one embodiment, the component (ii) is one or more cross-linkers selected from the group consisting of starch, modified starch, CMC.

In one embodiment, the component (ii) is one or more cross-linkers in form of aliphatic multifunctional carbodiim ides.

In one embodiment, the component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

Component (ii) can also be any mixture of the above-mentioned compounds.

In one embodiment, the binder composition used with the present disclosure comprises component (ii) in an amount of 1 to 40 wt.-%, such as 4 to 20 wt.-%, such as 6 to 12 wt.-%, based on the dry weight of the first component.

Component (iii)

Component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyam ides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers.

Another particular surprising aspect of the present disclosure is that the use of plasticizers having a boiling point of more than 100° C., in particular 140 to 250° C., strongly improves the mechanical properties of the mineral fibre products according to the present disclosure although, in view of their boiling point, it is likely that these plasticizers will at least in part evaporate during the curing of the aqueous binders in contact with the mineral fibres.

In one embodiment, component (iii) comprises one or more plasticizers having a boiling point of more than 100° C., such as 110 to 280° C., more preferred 120 to 260° C., more preferred 140 to 250° C.

It is believed that the effectiveness of these plasticizers in the aqueous binder composition according to the present disclosure is associated with the effect of increasing the mobility of the oxidized lignins during the curing process. It is believed that the increased mobility of the lignins or oxidized lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetam ides, benzamide, fatty acid amides such as tall oil am ides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconam ides, aminoglucoseamides, sucrose esters, sorbitan esters.

It has surprisingly been found that the inclusion of plasticizers in the aqueous binder compositions according to the present disclosure strongly improves the mechanical properties of the mineral fibre products according to the present disclosure.

The term plasticizer refers to a substance that is added to a material in order to make the material softer, more flexible (by decreasing the glass-transition temperature Tg) and easier to process.

Component (iii) can also be any mixture of the above-mentioned compounds.

In one embodiment, component (iii) is present in an amount of 0.5 to 50, preferably 2.5 to 25, more preferably 3 to 15 wt.-%, based on the dry weight of component (i).

In a further embodiment of the binder used with the disclosure an aqueous binder composition comprising component (i) and an alternative component (iia) is described in the following.

In one embodiment an aqueous binder composition for mineral fibres comprises:
 a component (i) in form of one or more oxidized lignins;
 a component (iia) in form of one or more modifiers.

The excellent binder properties can also be achieved by a two-component system which comprises component (i) in form of one or more oxidized lignins and a component (iia) in form of one or more modifiers, and optionally any of the other components mentioned above and below.

In an embodiment, the component (iia) is a modifier in form of one or more compounds selected from the group consisting of epoxidized oils based on fatty acid triglycerides.

In one embodiment, the component (iia) is a modifier in form of one or more compounds selected from molecules having three or more epoxy groups.

In one embodiment, the component (iia) is a modifier in form of one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

In one embodiment, component (iia) is one or more modifiers selected from the group consisting of polyethylene imine, polyvinyl amine, fatty amines.

In one embodiment, the component (iia) is one or more modifiers selected from aliphatic multifunctional carbodiimides.

Component (iia) can also be any mixture of the above-mentioned compounds.

Without wanting to be bound by any particular theory, he excellent binder properties achieved by the binder composition for mineral fibres comprising component (i) and (iia), and optional further components, are at least partly due to the effect that the modifiers used as components (iia) at least partly serve the function of a plasticizer and a cross-linker.

In one embodiment, the aqueous binder composition comprises the component (iia) in an amount of 1 to 40 wt.-%, such as 4 to 20 wt.-%, such as 6 to 12 wt.-%, based on the dry weight of component (i).

Further Components

In some embodiments, the aqueous binder composition used with the present disclosure comprises further components.

In one embodiment, the aqueous binder composition used with the present disclosure comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid. The presence of such a catalyst can improve the curing properties of the aqueous binder composition used with the present disclosure.

In one embodiment, the aqueous binder composition used with the present disclosure comprises a catalyst selected from Lewis acids, which can accept an electron pair from a donor compound forming a Lewis adduct, such as $ZnCl_2$, $Mg(ClO_4)_2$, $Sn[N(SO_2-n-C_8F_{17})_2]_4$.

In one embodiment, the aqueous binder composition used with the present disclosure comprises a catalyst selected from metal chlorides, such as KCl, $MgCl_2$, $ZnCl_2$, $FeCl_3$ and $SnCl_2$.

In one embodiment, the aqueous binder composition used with the present disclosure comprises a catalyst selected from organometallic compounds, such as titanate-based catalysts and stannum based catalysts.

In one embodiment, the aqueous binder composition used with the present disclosure comprises a catalyst selected from chelating agents, such as transition metals, such as iron ions, chromium Ions, manganese ions, copper ions.

In one embodiment, the aqueous binder composition used with the present disclosure further comprises a further component (iv) in form of one or more silanes.

In one embodiment, the aqueous binder composition used with the present disclosure comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea functionalized silanes or vinyl functionalized silanes.

In one embodiment, the aqueous binder composition used with the present Disclosure further comprises a component (v) in form of one or more components selected from the group of ammonia, amines or any salts thereof.

It has been found that the inclusion of ammonia, amines or any salts thereof as a further component (v) can in particular be useful when oxidized lignins are used in the component (i), which oxidised lignin have not been oxidized in the presence of ammonia.

In one embodiment, the aqueous binder composition used with the present disclosure further comprises a further component in form of urea, in particular in an amount of 5 to 40 wt.-%, such as 10 to 30 wt.-%, 15 to 25 wt.-%, based on the dry weight of the component (i).

In one embodiment, the aqueous binder composition used with the present disclosure further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60 to 99, such as DE=85 to 99, such as DE=95 to 99.

In one embodiment, the aqueous binder composition used with the present disclosure further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context with a binder used with the present disclosure, the binder composition having a sugar content of 50 wt.-% or more, based on the total dry weight of the binder components, is considered to be a sugar-based binder. A binder composition having a sugar content of less than 50 wt.-% based on the total dry weight of the binder components, is considered a non-sugar-based binder.

In one embodiment, the aqueous adhesive composition used with the present disclosure further comprises a further component in form of one or more surface active agents that are in the form of non-ionic and/or ionic emulsifiers such as polyoxyethylene (4) lauryl ether, such as soy lecithin, such as sodium dodecyl sulfate.

In one embodiment, the aqueous binder composition used with the present disclosure comprises
- a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
- a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diannines, such as hexamethyldiamine, triamines;
- a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i), and component (iii) is present in an amount of 0.5 to 50 wt.-%, preferably 2.5 to 25 wt.-%, more preferably 3 to 15 wt.-%, based on the dry weight of component (i).

In one embodiment, the aqueous binder composition used with the present disclosure comprises
- a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
- a component (ii) in form of one or more modifiers selected from epoxidized oils based on fatty acid triglycerides.

In one embodiment, the aqueous binder composition used with the present disclosure comprises
- a component (i) in form of one or more ammonia-oxidized lignins having an average carboxylic acid group content of more than 1.5 groups per macromolecule of the first component, such as more than 2 groups, such as more than 2.5 groups;
- a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
- a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i) and component (iii) is present in an amount of 0.5 to 50 wt.-%, preferably 2.5 to 25 wt.-%, more preferably 3 to 15 wt.-%, based on the dry weight of component (i).

In one embodiment, the aqueous binder composition used with the present disclosure comprises
- a component (i) in form of one or more ammonia-oxidized lignins having an average carboxylic acid group content of more than 1.5 groups per macromolecule of component (i), such as more than 2 groups, such as more than 2.5 groups;
- a component (iia) in form of one or more modifiers selected from epoxidized oils based on fatty acid triglycerides.

In one embodiment, the aqueous binder composition used with the present disclosure consists essentially of
- a component (i) in form of one or more oxidized lignins;
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

In one embodiment, the aqueous binder composition used with the present disclosure consists essentially of
- a component (i) in form of one or more oxidized lignins;
- a component (iia) in form of one or more modifiers selected from epoxidized oils based on fatty acid triglycerides;
- a component (iv) in form of one or more coupling agents, such as organofunctional silanes;
- optionally a component in form of one or more compounds selected from the group of ammonia, amines or any salts thereof;
- optionally a component in form of urea;
- optionally a component in form of a more reactive or non-reactive silicones;
- optionally a hydrocarbon oil;
- optionally one or more surface active agents;
- water.

Preparation of the Ammonia Oxidized Lignin (AOL) Resin 3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour is a check made on insolubilized lignin. This can be made by checking the solution on a glass plate or a Hegman gauge. Insolubilized lignin is seen as small particles in the brown binder. During the dissolution step will the lignin solution change color from brown to shiny black.

After the lignin is completely dissolved, 1 liter of a foam dampening agent (Skumdmper 11-10 from NCA-Verodan) is added. Temperature of the batch is maintained at 40° C.

Then addition of 307,5 kg 35% hydrogen peroxide is started. The hydrogen peroxide is dosed at a rate of 200 to 300 liter/hour. First half of the hydrogen peroxide is added at a rate of 200 liter/hour where after the dosage rate is increased to 300 liter/hour.

During the addition of hydrogen peroxide is the temperature in the reaction mixture controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.2 mmol/g solids.

Final Binder Preparation

From the above-mentioned AOL resin a binder was formulated by addition of 270 kg polyethylene glycol 200 and 433 kg of a 31% solution of Primid XL-552 in water. Primid XL552 has the following structure:

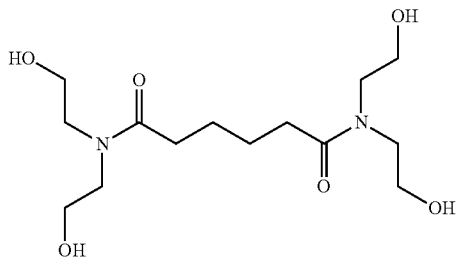

Primid XL-552

Analysis of the Final Binder Showed the Following Data
  Solids content: 18.9% pH: 9.7
  Viscosity: 25.5 mPas·s
  Density: 1.066 kg/l Oxidized Lignins which can be Used as Component in the Aqueous Binder Composition for Mineral Fibres According to the Present Disclosure and Method for Preparing Such Oxidized Lignins In the following, oxidized lignins are described which can be used as Method I to Prepare Oxidised Lignins Oxidized lignins, which can be used as component for the binders used in the present disclosure can be prepared by a method comprising bringing into contact
  a component (a) comprising one or more lignins
  a component (b) comprising ammonia, one or more amine components, and/or any salt thereof.
  a component (c) comprising one or more oxidation agents.

Component (a)

Component (a) comprises one or more lignins.

In one embodiment of the method according to the present disclosure, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present disclosure, component (b) comprises ammonia, one or more amino components, and/or any salts thereof. Without wanting to be bound by any particular theory, the present inventors believe that replacement of the alkali hydroxides used in previously known oxidation processes of lignin by ammonia, one or more amino components, and/or any salts thereof, plays an important role in the improved properties of the oxidized lignins prepared according to the method of the present disclosure.

The present inventors have surprisingly found that the lignins oxidized by an oxidation agent in the presence of ammonia or amines contain significant amounts of nitrogen as a part of the structure of the oxidized lignins. Without wanting to be bound to any particular theory, the present inventors believe that the improved fire resistance properties of the oxidized lignins when used in products where they are comprised in a binder composition, said oxidized lignins prepared by the method according to the present disclosure, are at least partly due to the nitrogen content of the structure of the oxidized lignins.

In one embodiment, component (b) comprises ammonia and/or any salt thereof.

Without wanting to be bound by any particular theory, the present inventors believe that the improved stability properties of the derivatized lignins prepared according to the present disclosure are at least partly due to the fact that ammonia is a volatile compound and therefore evaporates from the final product or can be easily removed and reused. In contrast to that, it has proven difficult to remove residual amounts of the alkali hydroxides used in the previously known oxidation process.

Nevertheless, it can be advantageous in the method according to the present disclosure that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present disclosure, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

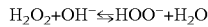

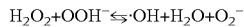

The present inventors have found that the derivatized lignins prepared with the method according to the present disclosure contain increased amounts of carboxylic acid groups as a result of the oxidation process. Without wanting to be bound by any particular theory, the present inventors believe that the carboxylic acid group content of the oxidized lignins prepared in the process according to the present disclosure plays an important role in the desirable reactivity properties of the derivatized lignins prepared by the method according to the present disclosure.

Another advantage of the oxidation process is that the oxidised lignin is more hydrophilic. Higher hydrophilicity can enhance solubility in water and facilitate the adhesion to polar substrates such as mineral fibres.

Further Components

In one embodiment, the method according to the present disclosure comprises further components, in particular a component (d) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method according to the present disclosure.

Mass Ratios of the Components

The person skilled in the art will use the components (a), (b) and (c) in relative amounts that the desired degree of oxidation of the lignins is achieved.

In one embodiment,
  a component (a) comprises one or more lignins
  a component (b) comprises ammonia
  a component (c) comprises one or more oxidation agents in form of hydrogen peroxide,
wherein the mass ratios of lignin, ammonia and hydrogen peroxide are such that the amount of ammonia is 0.01 to 0.5 weight parts, such as 0.1 to 0.3 weight parts, such as 0.15 to 0.25 weight parts ammonia, based on the dry weight of lignin, and wherein the amount of hydrogen peroxide is 0.025 to 1.0 weight parts, such as 0.05 to 0.2 weight parts, such as 0.075 to 0.125 weight parts hydrogen peroxide, based on the dry weight of lignin.

Process

There is more than one possibility to bring the components (a), (b) and (c) in contact to achieve the desired oxidation reaction.

In one embodiment, the method comprises the steps of:
  a step of providing component (a) in form of an aqueous solution and/or dispersion of one more lignins, the lignin content of the aqueous solution being 1 to 50 wt.-%, such as 5 to 25 wt.-%, such as 15 to 22 wt.-%, such as 18 to 20 wt.-%, based on the total weight of the aqueous solution;
  a pH adjusting step by adding component (b) comprising an aqueous solution of ammonia, one or more amine components, and/or any salt thereof;
  an oxidation step by adding component (c) comprising an oxidation agent.

In one embodiment, the pH adjusting step is carried so that the resulting aqueous solution and/or dispersion is having a pH≥9, such as ≥10, such as ≥10.5.

In one embodiment, the pH adjusting step is carried out so that the resulting aqueous solution and/or dispersion is having a pH in the range of 10.5 to 12.

In one embodiment, the pH adjusting step is carried out so that the temperature is allowed to raise to ≥25° C. and then controlled in the range of 25 to 50° C., such as 30 to 45° C., such as 35 to 40° C.

In one embodiment, during the oxidation step, the temperature is allowed to raise ≥35° C. and is then controlled in the range of 35 to 150° C., such as 40 to 90° C., such as 45 to 80° C.

In one embodiment, the oxidation step is carried out for a time of 1 second to 48 hours, such as 10 seconds to 36 hours, such as 1 minute to 24 hours such as 2 to 5 hours.

Method II to Prepare Oxidized Lignins

Oxidized lignins, which can be used as component for the binders used in the present disclosure can be prepared by a method comprising bringing into contact
  a component (a) comprising one or more lignins
  a component (b) comprising ammonia and/or one or more amine components, and/or any salt thereof and/or an alkali and/or earth alkali metal hydroxide, such as sodium hydroxide and/or potassium hydroxide
  a component (c) comprising one or more oxidation agents
  a component (d) in form of one or more plasticizers.

Component (a)

Component (a) comprises one or more lignins.

In one embodiment of the method according to the present disclosure, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present disclosure, component (b) comprises ammonia, one or more amino components, and/or any salts thereof and/or an alkali and/or earth alkali metal hydroxide, such as sodium hydroxide and/or potassium hydroxide.

"Ammonia-oxidized lignins" is to be understood as a lignin that has been oxidized by an oxidation agent in the presence of ammonia. The term "ammonia-oxidized lignin" is abbreviated as AOL.

In one embodiment, component (b) comprises ammonia and/or any salt thereof.

Without wanting to be bound by any particular theory, the present inventors believe that the improved stability properties of the derivatized lignins prepared according to the present disclosure with component (b) being ammonia and/or any salt thereof are at least partly due to the fact that ammonia is a volatile compound and therefore evaporates from the final product or can be easily removed and reused.

Nevertheless, it can be advantageous in this embodiment of the method according to the present disclosure that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present disclosure, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism, multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

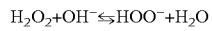

$$H_2O_2 + OH^- \leftrightarrows HOO^- + H_2O$$

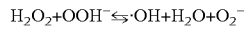

$$H_2O_2 + OOH^- \leftrightarrows \cdot OH + H_2O + O_2^-$$

The present inventors have found that the derivatized lignins prepared with the method according to the present disclosure contain increased amounts of carboxylic acid groups as a result of the oxidation process. Without wanting to be bound by any particular theory, the present inventors believe that the carboxylic acid group content of the oxidized lignins prepared in the process according to the present disclosure plays an important role in the desirable reactivity properties of the derivatized lignins prepared by the method according to the present disclosure.

Another advantage of the oxidation process is that the oxidized lignin is more hydrophilic. Higher hydrophilicity can enhance solubility in water and facilitate the adhesion to polar substrates such as mineral fibres.

Component (d)

Component (d) comprises one or more plasticizers.

In one embodiment according to the present disclosure, component (d) comprises one or more plasticizers in form of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyam ides, amides such as carbamide/urea, or any mixtures thereof.

The present inventors have found that the inclusion of component (d) in form of one or more plasticizers provides a decrease of the viscosity of the reaction mixture which allows a very efficient method to produce oxidized lignins.

In one embodiment according to the present disclosure, component (d) comprises one or more plasticizers in form of polyols, such as carbohydrates, hydrogenated sugars, such as sorbitol, erythriol, glycerol, monoethylene glycol, polyethylene glycols, polyvinyl alcohol, acrylic based polymers with free carboxy groups and/or polyurethane dispersions with free carboxy groups, polyamides, amides such as carbamide/urea, or any mixtures thereof.

In one embodiment according to the present disclosure, component (d) comprises one or more plasticizers selected from the group of polyethylene glycols, polyvinyl alcohol, urea or any mixtures thereof.

Further Components

In one embodiment, the method according to the present disclosure comprises further components, in particular a component (v) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method.

Mass Ratios of the Components

The person skilled in the art will use the components (a), (b), (c), and (d) in relative amounts that the desired degree of oxidation of the lignins is achieved.

In one embodiment, the method according to the present disclosure is carried out such that the method comprises
  a component (a) comprises one or more lignins
  a component (b) comprises ammonia
  a component (c) comprises one more oxidation agents in form of hydrogen peroxide,
  a component (d) comprises one or more plasticizers selected from the group of polyethylene glycol,
  wherein the mass ratios of lignin, ammonia, hydrogen peroxide and polyethylene glycol are such that the amount of ammonia is 0.01 to 0.5 weight parts, such as 0.1 to 0.3, such as 0.15 to 0.25 weight parts ammonia (25 wt.-% solution in water), based on the dry weight of lignin, and wherein the amount of hydrogen peroxide (30 wt.-% solution in water) is 0.025 to 1.0 weight parts, such as 0.07 to 0.50 weight parts, such as 0.15 to 0.30 weight parts hydrogen peroxide, based on the dry weight of lignin, and wherein the amount of polyethylene glycol is 0.03 to 0.60 weight parts, such as 0.07 to 0.50 weight parts, such as 0.10 to 0.40 weight parts polyethylene glycol, based on the dry weight of lignin.

For the purpose of the present disclosure, the "dry weight of lignin" is preferably defined as the weight of the lignin in the supplied form.

Process

There is more than one possibility to bring the components (a), (b), (c), and (d) in contact to achieve the desired oxidation reaction.

In one embodiment, the method comprises the steps of:
  a step of providing component (a) in form of an aqueous solution and/or dispersion of one more lignins, the lignin content of the aqueous solution being 5 to 90 wt.-%, such as 10 to 85 wt.-%, such as 15 to 70 wt.-%, based on the total weight of the aqueous solution;
  a pH adjusting step by adding component (b);
  a step of adding component (d);
  an oxidation step by adding component (c) comprising an oxidation agent.

In one embodiment, the pH adjusting step is carried so that the resulting aqueous solution and/or dispersion is having a pH≤9, such as ≤10, such as ≤10.5.

In one embodiment, the pH adjusting step is carried out so that the resulting aqueous solution and/or dispersion is having a pH in the range of 9.5 to 12.

In one embodiment, the pH adjusting step is carried out so that the temperature is allowed to raise to ≤25° C. and then controlled in the range of 25 to 50° C., such as 30 to 45° C., such as 35 to 40° C.

In one embodiment, during the oxidation step, the temperature is allowed to raise to ≤35° C. and is then controlled in the range of 35 to 150° C., such as 40 to 90° C., such as 45 to 80° C.

In one embodiment, the oxidation step is carried out for a time of 1 seconds to 24 hours, such as 1 minutes to 12 hours, such as 10 minutes to 8 hours, such as 5 minutes to 1 hour.

The present inventors have found that the process according to the present disclosure allows to produce a high dry matter content of the reaction mixture and therefore a high throughput is possible in the process according to the present disclosure which allows the reaction product in form of the oxidized lignins to be used as a component in industrial mass production products such as mineral fibre products.

In one embodiment, the method according to the present disclosure is carried out such that the dry matter content of the reaction mixture is 20 to 80 wt.-%, such as 40 to 70 wt.-%.

In one embodiment, the method according to the present disclosure is carried out such that the viscosity of the oxidised lignin has a value of 100 cP to 100.000 cP, such as a value of 500 cP to 50.000 cP, such as a value of 1.000 cP to 25.000 cP.

For the purpose of the present disclosure, viscosity is dynamic viscosity and is defined as the resistance of the liquid/paste to a change in shape, or movement of neighbouring portions relative to one another. The viscosity is measured in centipoise (cP), which is the equivalent of 1 mPa s (millipascal second). Viscosity is measured at 20° C. using a viscometer. For the purpose of the present disclosure, the dynamic viscosity can be measured at 20° C. by a Cone Plate Wells Brookfield Viscometer.

In one embodiment, the method according to the present disclosure is carried out such that the method comprises a rotator-stator device.

In one embodiment, the method according to the present disclosure is carried out such that the method is performed as a continuous or semi-continuous process.

Apparatus for Performing the Method

The present disclosure is also directed to an apparatus for performing the method described above.

In one embodiment, the apparatus for performing the method comprises:
a rotor-stator device,
a premixing device for component (a), (b), (d)
one or more inlets for water, components (a), (b), (c) and (d),
one or more outlets for an oxidized lignin.

In one embodiment, the apparatus is constructed in such a way that the inlets for the premix of the components (a), (b) and (d) are to the rotor-stator device and the apparatus furthermore comprises a chamber, said chamber having an inlet for component (c) and said chamber having an outlet for an oxidised lignin.

A rotator-stator device is a device for processing materials comprising a stator configured as an inner cone provided with gear rings. The stator cooperates with a rotor having arms projecting from a hub. Each of these arms bears teeth meshing with the teeth of the gear rings of the stator. With each turn of the rotor, the material to be processed is transported farther outward by one stage, while being subjected to an intensive shear effect, mixing and redistribution. The rotor arm and the subjacent container chamber of the upright device allow for a permanent rearrangement of the material from the inside to the outside and provide for a multiple processing of dry and/or highly viscous matter so that the device is of excellent utility for the intensive mixing, kneading, fibrillating, disintegrating and similar processes important in industrial production. The upright arrangement of the housing facilitates the material's falling back from the periphery toward the centre of the device.

In one embodiment, the rotator-stator device used in the method according to the present disclosure comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the centre.

For more details of the rotator-stator device to be used in one embodiment of the method, reference is made to US 2003/0042344 A1, which is incorporated by reference.

In one embodiment, the method is carried out such that the method uses one rotator-stator device. In this embodiment, the mixing of the components and the reaction of the components is carried out in the same rotator-stator device.

In one embodiment, the method is carried out such that the method uses two or more rotator-stator devices, wherein at least one rotator-stator device is used for the mixing of the components and at least one rotator-stator device is used for reacting the components.

This process can be divided into two steps:
1. Preparation of the Lignin mass (a)+(b)+(d)
2. Oxidization of the lignin mass Typically, two different types of rotor-/stator machines are used:
1. Open rotor-/stator machine suitable for blending in the lignin powder into water on a very high concentration (30 to 50 wt.-%). Less intensive mixing but special auxiliaries (inlet funnel, screw etc.) to handle highly viscous materials. Lower circumferential speed (up to 15 m/s). The machine can be used as batch system or continuous.
2. Inline rotor-/stator machine which has much higher shear forces—circumferential speeds of up to 55 m/s—and creates beneficial conditions for a very quick chemical reaction. The machine is to be used continuously.

In the open rotor-/stator system the highly concentrated (45 to 50 wt.-%) mass of Lignin/water is prepared. The lignin powder is added slowly to the warm water (30 to 60° C.) in which the correct amount of watery ammonia and/or alkali base have been added. This can be done in batch mode, or the materials are added intermittently/continuously creating a continuous flow of mass to the next step.

The created mass should be kept at a temperature of about 60° C. to keep the viscosity as low as possible and hence the material pumpable. The hot mass of lignin/water at a pH of 9 to 12 is then transferred using a suitable pump, e.g. progressive cavity pump or another volumetric pump, to the oxidation step.

In on embodiment the oxidation is done in a closed rotor-/stator system in a continuous inline reaction. A watery solution of ammonia and/or alkali base is dosed with a dosing pump into the rotor-/stator chamber at the point of highest turbulence/shear. This ensures a rapid oxidation reaction. The oxidized material (AOL) leaves the inline-reactor and is collected in suitable tanks.

Reaction Product

The present inventors have surprisingly found, that the oxidized lignins prepared have very desirable reactivity properties and at the same time display improved fire resistance properties when used in products where they are comprised in a binder composition, and improved long-term stability over previously known oxidized lignins.

The oxidised lignin also displays improved hydrophilicity.

An important parameter for the reactivity of the oxidized lignins prepared is the carboxylic acid group content of the oxidized lignins.

In one embodiment, the oxidized lignin prepared has a carboxylic acid group content of 0.05 to 10 mmol/g, such as 0.1 to 5 mmol/g, such as 0.20 to 2.0 mmol/g, such as 0.40 to 1.5 mmol/g, such as 0.45 to 1.0 mmol/g, based on the dry weight of component (a).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared has an average carboxylic acid group content of more than 1.5 groups per macromolecule of component (a), such as more than 2 groups, such as more than 2.5 groups.

Method III to Prepare Oxidized Lignins

Oxidized lignins, which can be used as a component for the binder used in the present disclosure can be prepared by a method comprising bringing into contact
 a component (a) comprising one or more lignins,
 a component (b) comprising ammonia and/or one or more amine components, and/or any salt thereof and/or an alkali and/or earth alkali metal hydroxide, such as sodium hydroxide and/or potassium hydroxide,
 a component (c) comprising one or more oxidation agents,
 optionally a component (d) in form of one or more plasticizers, and allowing a mixing/oxidation step, wherein an oxidised mixture is produced, followed by an oxidation step, wherein the oxidised mixture is allowed to continue to react for a dwell time of dwell time of 1 second to 10 hours, such as 10 seconds to 6 hours, such as 30 seconds to 2 hours.

Components (a), (b), (c) and (d) are as defined above under method II to prepare oxidized lignins.

In one embodiment of the disclosure, the process comprises a premixing step in which components are brought into contact with each other.

In the premixing step the following components can be brought into contact with each other:
 component (a) and component (b), or
 component (a) and component (b) and component (c), or
 component (a) and component (b) and component (d), or
 component (a) and component (b) and component (c) and component (d).

In an embodiment of the disclosure, it is possible that the premixing step is carried out as a separate step and the mixing/oxidation step is carried out subsequently to the premixing step. In such an embodiment of the disclosure it is particularly advantageous to bring component (a) and component (b) and optionally component (d) into contact with each other in a premixing step. In a subsequent mixing/oxidation step, component (c) is then added to the premixture produced in the premixing step.

In another example of the disclosure, it is possible that the premixing step corresponds to the mixing/oxidation step. In this embodiment of the disclosure, the components, for example component (a), component (b) and component (c) are mixed and an oxidation process is started at the same time. It is possible that the subsequent dwell time is performed in the same device as that used to perform the mixing/oxidation step. Such an implementation of the disclosure is particularly advantageous if component (c) is air.

The present inventors have found out that by allowing a mixing/oxidation step followed by an oxidation step, in which the reaction mixture is preferably not continued to be mixed, the oxidation rate can be controlled in a very efficient manner. At the same time, the costs for performing the method are reduced because the oxidation step subsequent to the mixing/oxidation step requires less complex equipment.

Another advantage is that oxidized lignin, which is produced is particularly stable. Another surprising advantage is that the oxidized lignin produced is very well adjustable in terms of viscosity. Another surprising advantage is that the concentration of the oxidized lignin can be very high.

In one embodiment, the dwell time is so chosen that the oxidation reaction is brought to the desired degree of completion, preferably to full completion.

System I for performing the method III

In one embodiment, the system for performing the method comprises:
 at least one rotor-stator device,
 one or more inlets for water and components (a) and (b),
 one or more outlets of the rotor-stator device,
 at least one reaction device, in particular at least one reaction tube, which is arranged downstream in the process flow direction to at least one or more of the outlets.

In one embodiment, the system comprises one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment of the disclosure, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also, in this embodiment of the disclosure, it is possible that the premixing device optionally comprises an inlet for component (d).

In one embodiment, the system is constructed in such a way that the inlets for components (a), (b) and (d) are inlets of a premixing device, in particular of an open rotor-stator device, whereby the system furthermore comprises an additional rotor-stator device, said additional rotor-stator device having an inlet for component (c) and said additional rotor-stator device having an outlet for an oxidized lignin.

It is possible that the premixing step and the mixing/oxidizing step are carried out simultaneously. In this case, the premixing device and the mixing/oxidizing device are a single device, i. e. a rotor-stator device.

In one embodiment, one rotator-stator device used in the method according to the present disclosure comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the centre.

System II for Performing the Method III

In one embodiment, the system for performing the method comprises:
one or more inlets for water, components (a) and (b),
at least one mixing and oxidizing apparatus with one or more outlets, and
at least one mixer/heat-exchanger, which is arranged downstream in the process flow direction to the at least one or more of the outlets, whereby the mixer/heat-exchanger comprises a temperature control device.

In one embodiment, the system comprises additional one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also, in this embodiment of the disclosure, it is possible that the premixing device optionally comprises an inlet for component (d).

In one embodiment, the system is constructed in such a way that the inlets for components (a), (b) and (d) are inlets of an open rotor-stator device, whereby the system furthermore comprises a mixer/heat-exchanger, having an inlet for component (c) and an outlet for an oxidized lignin.

It is possible that the premixing step and the mixing/oxidizing step are carried out simultaneously. In this case, the premixing device and the mixing/oxidizing device are a single device.

In one embodiment, one rotator-stator device used in the method according to the present disclosure comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the centre.

Of course, other devices can also be used as premixing devices. Furthermore, it is possible that the premixing step is carried out in the mixing and oxidizing apparatus.

In one embodiment, the mixing and oxidizing apparatus is a static mixer. A static mixer is a device for the continuous mixing of fluid materials, without moving components. One design of static mixer is the plate-type mixer and another common device type consists of mixer elements contained in a cylindrical (tube) or squared housing.

In one embodiment, the mixer/heat-exchanger is constructed as multitube heat exchanger with mixing elements. The mixing element are preferably fixed installations through which the mixture has to flow, whereby mixing is carried out as a result of the flowing through. The mixer/heat-exchanger can be constructed as a plug flow reactor.

EXAMPLES I

Example IA—Lignin Oxidation in Ammonia Aqueous Solution by Hydrogen Peroxide The amounts of ingredients used according to the example IA are provided in table IA 1.1 and IA 1.2.

Although kraft lignin is soluble in water at relatively high pH, it is known that at certain weight percentage the viscosity of the solution will strongly increase. It is typically believed that the reason for the viscosity increase lies in a combination of strong hydrogen bonding and interactions of 7-electrons of numerous aromatic rings present in lignin. For kraft lignin an abrupt increase in viscosity around 21 to 22 wt.-% in water was observed and 19 wt.-% of kraft lignin were used in the example presented.

Ammonia aqueous solution was used as base in the pH adjusting step. The amount was fixed at 4 wt.-% based on the total reaction weight. The pH after the pH adjusting step and at the beginning of oxidation was 10.7.

Table IA2 shows the results of CHNS elemental analysis before and after oxidation of kraft lignin. Before the analysis, the samples were heat treated at 160° C. to remove adsorbed ammonia. The analysis showed that a certain amount of nitrogen became a part of the structure of the oxidised lignin during the oxidation process.

During testing in batch experiments, it was determined that it is beneficial for the oxidation to add the entire amount of hydrogen peroxide during small time interval contrary to adding the peroxide in small portions over prolonged time period. In the present example 2.0 wt.-% of $H_2O_2$ based on the total reaction weight was used.

The oxidation is an exothermic reaction and increase in temperature is noted upon addition of peroxide. In this example, temperature was kept at 60° C. during three hours of reaction.

After the oxidation, the amount of lignin functional groups per gram of sample increased as determined by $^{31}P$ NMR and aqueous titration. Sample preparation for $^{31}P$ NMR was performed by using 2-chloro-4,4,5,5-tetramethyl-1,3,2-dioxaphospholane (TMDP) as phosphitylation reagent and cholesterol as internal standard. NMR spectra of kraft lignin before and after oxidation were made and the results are summarized in table IA3.

The change in COOH groups was determined by aqueous titration and utilization of the following formula:

$$C_{(COOH, mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{is}$ are endpoint volumes of a sample while $V_{2b}$ and $V_{1b}$ are the volume for the blank. $C_{acid}$ is 0.1M HCl in this case and $m_s$ is the weight of the sample. The values obtained from aqueous titration before and after oxidation are shown in table IA4.

The average COOH functionality can also be quantified by a saponification value which represents the number of mg of KOH required to saponify 1 g lignin. Such a method can be found in AOCS Official Method Cd 3-25.

Average molecular weight was also determined before and after oxidation with a PSS PolarSil column (9:1 (v/v) dimethyl sulphoxide/water eluent with 0.05 M LiBr) and UV detector at 280 nm. Combination of COOH concentration and average molecular weight also allowed calculating average carboxylic acid group content per lignin macromolecule and these results are shown in table IA5.

Example IB—Upscaling the Lignin Oxidation in Ammonia by Hydrogen Peroxide to Pilot Scale Lignin oxidation with hydrogen peroxide is an exothermic process and even in lab-scale significant temperature increases were seen upon addition of peroxide. This is a natural concern when scaling up chemical processes since the amount of heat produced is related to dimensions in the 3rd power (volume) whereas cooling normally only increases with dimension squared (area). In addition, due to the high viscosity of the adhesive intermediates process equipment has to be carefully selected or designed. Thus, the scale up was carefully engineered and performed in several steps.

The first scale up step was done from 1 L (lab scale) to 9 L using a professional mixer in stainless steel with very efficient mechanical mixing The scale-up resulted only in a slightly higher end temperature than obtained in lab scale, which was attributed to efficient air cooling of the reactor and slow addition of hydrogen peroxide The next scale up step was done in a closed 200 L reactor with efficient water jacket and an efficient propeller stirrer. The scale was this time 180 L and hydrogen peroxide was added in two steps with appr. 30 minutes separation. This up-scaling went relatively well, though quite some foaming was an issue partly due to the high degree reactor filling. To control the foaming a small amount of food grade defoamer was sprayed on to the foam. Most importantly the temperature controllable and end temperatures below 70° C. were obtained using external water-cooling.

The pilot scale reactions were performed in an 800 L reactor with a water-cooling jacket and a twin blade propeller stirring. 158 kg of lignin level were carefully monitored during and after the addition of hydrogen peroxide and cooling water was added to the cooling jacket in order to maintain an acceptable foam level and a temperature rise less than 4° C. per minute as well as a final temperature below 70° C. After the temperature increase had stopped, cooling was turned off and the product mixture was stirred for another 2 hours before transferring to transport (UPM LignoBoost™ BioPiva 100) with a dry-matter content of 67 wt.-% was de-lumped and suspended in 224 kg of water and stirred to form a homogenous suspension. With continued stirring 103 kg of 25% ammonia in water was pumped into the reactor and stirred another 2 hours to from a dark viscous solution of lignin.

To the stirred lignin solution 140 kg of 7.5 wt.-% at 20 to 25° C. hydrogen peroxide was added over 15 minutes. Temperature and foam container.

Based on the scale up runs it could be concluded that even though the reactions are exothermic a large part of the reaction heat is actually balanced out by the heat capacity of the water going from room temperature to about 60° C., and only the last part has to be removed by cooling. It should be noted that due to this and due to the short reaction-time this process would be ideal for a scale up and process intensification using continuous reactors such as in-line mixers, tubular reactors or CSTR type reactors. This would ensure good temperature control and a more well-defined reaction process.

Tests of the scale up batches indicated the produced oxidised lignin had properties in accordance to the batches produced in the lab.

TABLE IA 1.1

The amounts of materials used in their supplied form:

| material | wt.-% |
|---|---|
| UPM BioPiva 100, kraft lignin | 28 |
| $H_2O_2$, 30 wt.-% solution in water | 6.6 |
| $NH_3$, 25 wt.-%, aqueous solution | 16 |
| water | 49.4 |

TABLE IA 1.2

The amounts of active material used:

| material | wt.-% |
|---|---|
| kraft lignin | 19 |
| $H_2O_2$ | 2 |
| $NH_3$ | 4 |
| water | 75 |

TABLE IA 2

Elemental analysis of kraft lignin before and after oxidation:

| sample | N (wt.-%) | C (wt.-%) | H (wt.-%) | S (wt.-%) |
|---|---|---|---|---|
| kraft lignin | 0.1 | 64.9 | 5.8 | 1.7 |
| ammonia oxidised kraft lignin | 1.6 | 65.5 | 5.7 | 1.6 |

TABLE IA 3

Kraft lignin functional group distribution before and after oxidation obtained by $^{31}$P-NMR:

| | Concentration (mmol/g) | | |
|---|---|---|---|
| sample | Aliphatic OH | Phenolic OH | Acid OH |
| kraft lignin | 1.60 | 3.20 | 0.46 |
| ammonia oxidised kraft lignin | 2.11 | 3.60 | 0.80 |

TABLE IA 4

COOH group content in mmol/g as determined by aqueous titration:

| sample | COOH groups (mmol/g) |
|---|---|
| kraft lignin | 0.5 |
| ammonia oxidised kraft lignin | 0.9 |

TABLE IA 5

Number (Mn) and weight (Mw) average molar masses as determined by size exclusion chromatography expressed in g/mol together with average carboxylic acid group content per lignin macromolecule before and after oxidation

| sample | Mn, g/mol | Mw, g/mol | Average functionality COOH |
|---|---|---|---|
| kraft lignin | 1968 | 21105 | 0.9 |
| ammonia oxidised kraft lignin | 2503 | 34503 | 2.0 |

EXAMPLES II

In the following examples, several oxidized lignins were prepared.

The following properties were determined for the oxidized lignins:

Component Solids Content:

The content of each of the components in a given oxidized lignin solution is based on the anhydrous mass of the components or as stated below.

Kraft lignin was supplier by UPM as BioPiva100™ as dry powder. NH$_4$OH 25% was supplied by Sigma-Aldrich and used in supplied form. H$_2$O$_2$, 30% (Cas no 7722-84-1) was supplied by Sigma-Aldrich and used in supplied form or by dilution with water. PEG 200 was supplied by Sigma-Aldrich and were assumed anhydrous for simplicity and used as such. PVA (Mw 89.000-98.000, Mw 85.000-124.000, Mw 130.000, Mw 146.000-186.000) (Cas no 9002-89-5) were supplied by Sigma-Aldrich and were assumed anhydrous for simplicity and used as such. Urea (Cas no 57-13-6) was supplied by Sigma-Aldrich and used in supplied form or diluted with water. Glycerol (Cas no 56-81-5) was supplied by Sigma-Aldrich and was assumed anhydrous for simplicity and used as such.

Oxidised Lignin Solids

The content of the oxidised lignin after heating to 200° C. for 1 hour is termed "Dry solid matter" and stated as a percentage of remaining weight after the heating.

Disc-shaped stone wool samples (diameter: 5 cm; height 1 cm) were cut out of stone wool and heat-treated at 580° C. for at least 30 minutes to remove all organics. The solids of the binder mixture were measured by distributing a sample of the binder mixture (approx. 2 g) onto a heat-treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the dry solids matter was calculated as an average of the two results.

COOH Group Content

The change in COOH group content was also determined by aqueous titration and utilization of the following formula:

$$C_{(COOH, mmol/g)} = \frac{(V_{2s,ml} - V_{1s,ml}) - (V_{2b,ml} - V_{1b,ml}) * C_{acid,mol/l}}{m_{s,g}}$$

where $V_{2s}$ and $V_{1s}$ are endpoint volumes of a sample while $V_2b$ and $V_{1b}$ are the volume for a blank sample. $C_{acid}$ is 0.1M HCl in this case and $m_{s,g}$ is the weight of the sample.

Method of producing an oxidized lignin:
1. Water and lignin were mixed in a 3-necked glass bottomed flask at water bath at room temperature (20 to 25° C.) during agitation connected with a condenser and a temperature logging device. Stirred for 1 h.
2. Ammonia was added during agitation in 1 portion.
3. Temperature increased to 35° C. by heating, if the slightly exothermic reaction with ammonia does not increase the temperature.
4. pH was measured.
5. Plasticizer PEG200 was added and stirred 10 min.
6. After the lignin was completely dissolved after approximately 1 hour, 30% H$_2$O$_2$ was added slowly in one portion.
7. The exothermic reaction by addition of H$_2$O$_2$ increased the temperature in the glass bottomed flask—if the reaction temperature was lower than 60° C., the temperature was increased to 60° C. and the sample was left at 60° C. for 1 hour.
8. The round bottomed flask was then removed from the water bath and cooled to room temperature.
9. Samples were taken out for determination of dry solid matter, COOH, viscosity, density and pH.

Oxidized Lignin Compositions

In the following, the entry numbers of the oxidized lignin example correspond to the entry numbers used in Table II.

Example IIA 71,0 g lignin UPM Biopiva 100 was dissolved in 149,0 g water at 20° C. and added 13,3 g 25% NH$_4$OH and stirred for 1 h by magnetic stirrer, where after 16,8 g H$_2$O$_2$ 30% was added slowly during agitation. The temperature was increased to 60° C. in the water bath. After 1 h of oxidation, the water bath was cooled and hence the reaction was stopped. The resulting material was analysed for COOH, dry solid matter, pH, viscosity and density.

Example IIE 71,0 g lignin UPM Biopiva 100 was dissolved in 88,8 g water at 20° C. and added 13,3 g 25% NH$_4$OH and stirred for 1 hour by magnetic stirrer. PEG 200, 22,8 g was added and stirred for 10 min, where after 16,7 g H$_2$O$_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

Example IIC 71,0 g lignin UPM Biopiva 100 was dissolved in 57,1 g water at 20° C. and added 13,3 g 25% NH$_4$OH and stirred for 1 hour by mechanical stirrer, where after 16,6 g H$_2$O$_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

Example IIF 71,0 g lignin UPM Biopiva 100 was dissolved in 57,1 water at 20° C. and added 13,3 g 25% $NH_4OH$ and stirred for 1 hour by mechanical stirrer. PEG 200, 19,0 g was added and stirred for 10 min, where after 16,6 g $H_2O_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

TABLE IIA

| Example | Ex. IIA | Ex. IIB | Ex. IIC | Ex. IID | Ex. IIE | Ex. IIF | Ex. IIG | Ex. IIH | Ex. III | Ex. IIJ |
|---|---|---|---|---|---|---|---|---|---|---|
| Materials, weight in grams: | | | | | | | | | | |
| Lignin | 71.0 | 71.0 | 71.0 | 71.0 | 71.0 | 71.0 | 71.0 | 71.0 | 71.0 | 71.0 |
| Water | 149.0 | 88.8 | 57.1 | 17.7 | 88.8 | 57.1 | 17.7 | 88.8 | 57.1 | 17.7 |
| NH4OH (25 wt % solution in water) | 13.3 | 13.3 | 13.3 | 13.4 | 13.3 | 13.3 | 13.4 | 13.3 | 13.3 | 13.4 |
| H2O2 (30 wt % solution in water) | 16.8 | 16.7 | 16.6 | 17.2 | 16.7 | 16.6 | 17.2 | 16.7 | 16.6 | 17.2 |
| PEG200 | 0.0 | 0.0 | 0.0 | 0.0 | 22.8 | 19.0 | 14.2 | 0.0 | 0.0 | 0.0 |
| PVA | 0 | 0 | 0 | 0 | 0 | 0 | 0 | 5 | 10 | 15 |
| Urea (25 wt % solution in water) | 0 | 0 | 0 | 0 | 0 | 0 | 0 | 0 | 0 | 0 |
| Glycerol | 0 | 0 | 0 | 0 | 0 | 0 | 0 | 0 | 0 | 0 |
| Sorbitol | 0 | 0 | 0 | 0 | 0 | 0 | 0 | 0 | 0 | 0 |
| Dry solid matter in %, 200° C., 1 h | 18.2 | 27.1 | 30.5 | 40.1 | 26.5 | 33 | 40.3 | 28.2 | 34.4 | 46.3 |
| pH | 9.5 | 9.5 | 9.5 | 9.5 | 9.5 | 9.5 | 9.5 | 9.5 | 9.5 | 9.5 |
| Viscosity, 20° C. cP | 450.5 | 25000 | above 100000 | above 100000 | 15000 | 25000 | 50000 | 15000 | 25000 | 50000 |
| Appearance | ** | *** | * | * | *** | *** | *** | *** | *** | *** |
| COOH, mmol/g | 1.1 | 0.9 | 0.9 | 0.8 | 0.8 | 1.9 | — | — | — | — |
| Initial lignin conc. Weight fraction of aq. sol. | 0.32 | 0.44 | 0.55 | 0.80 | 0.44 | 0.55 | 0.80 | 0.44 | 0.55 | 0.80 |

| Example | Ex. IIK | Ex. IIL | Ex. IIM | Ex. IIN | Ex. IIO | Ex. IIP | Ex. IIQ | Ex. IIR | Ex. IIS |
|---|---|---|---|---|---|---|---|---|---|
| Materials, weight in grams: | | | | | | | | | |
| Lignin | 71.0 | 71.0 | 71.0 | 71.0 | 71.0 | 71.0 | 93.5 | 112.3 | 149.5 |
| Water | 88.8 | 57.1 | 17.7 | 88.8 | 57.1 | 17.7 | 117 | 90.3 | 37.3 |
| NH4OH (25 wt % solution in water) | 13.3 | 13.3 | 13.4 | 13.3 | 13.3 | 13.4 | 17.5 | 21 | 28.3 |
| H2O2 (30 wt % solution in water) | 16.7 | 16.6 | 17.2 | 16.7 | 16.6 | 17.2 | 22 | 26.3 | 36.3 |
| PEG200 | 0.0 | 0.0 | 0.0 | 0.0 | 0.0 | 0.0 | 0.0 | 0.0 | 0.0 |
| PVA | 0 | 0 | 0 | 0 | 0 | 0 | 0 | 0 | 0 |
| Urea (25 wt % solution in water) | 3.2 | 3.8 | 5.0 | 0 | 0 | 0 | 0 | 0 | 0 |
| Glycerol | 0 | 0 | 0 | 16.0 | 21.0 | 30.0 | 0 | 0 | 0 |
| Sorbitol | 0 | 0 | 0 | 0 | 0 | 0 | 16.0 | 21.0 | 30.0 |
| Dry solid matter in %, 200° C., 1 h | 25.1 | 30.2 | 40.2 | 25.3 | 29.3 | 40.3 | 25.3 | 30.5 | 38.8 |
| pH | 9.5 | 9.5 | 9.5 | 9.5 | 9.5 | 9.5 | 9.5 | 9.5 | 9.5 |
| Viscosity, 20° C. cP | 15000 | 25000 | 50000 | 15000 | 25000 | 50000 | 15000 | 25000 | 50000 |
| Appearance | *** | *** | *** | *** | *** | *** | *** | *** | *** |
| COOH, mmol/g | — | — | — | — | — | — | — | — | — |
| Initial lignin conc. Weight fraction of aq. sol. | 0.44 | 0.55 | 0.80 | 0.44 | 0.55 | 0.80 | 0.44 | 0.55 | 0.80 |

\* inhomogenous black thick solution;
\*\* black solution;
\*\*\* homogenous black thick solution.

EXAMPLE III 8,5 l hot water (50° C.) and 1,9 l NH$_4$OH (24,7%) was mixed, where after 9,0 kg lignin (UPM biopiva 100) was added slowly over 10 minutes at high agitation (660 rpm, 44 Hz).

The temperature increased by high shear forces. After 30 minutes, 4 l of hot water was added, and the material was stirred for another 15 minutes before adding the remaining portion of hot water (5 l). Samples were taken out for analyses of undissolved lignin by use of a Hegman Scale and pH measurements.

This premix was then transferred to a rotor-stator device and a reaction device where the oxidation was made by use of H$_2$O$_2$ (17,5 vol.-%). The reaction device used in this case has at least partially a reaction tube and a reaction vessel. Dosage of the premixture was 150 l/h and the H$_2$O$_2$ was dosed at 18 l/h.

In the present case, a Cavitron CD1000 rotor-stator device was used to carry out the mixing/oxidation step. The rotor-stator device was running at 250 Hz (55 m/s circumferential speed) with a counter pressure at 2 bar. The dwell time in the reaction tube was 3,2 minutes and in the reaction vessel 2 hours.

Temperature of the premixture was 62° C., and the oxidation step increased the temperature to 70° C.

The final product was analysed for the COOH group content, dry solid matter, pH, viscosity and remaining H$_2$O$_2$.

TABLE III

| Example | Dry solid matter, 200 C., 1 h, % | COOH, mmol/g solids | pH | viscosity |
|---|---|---|---|---|
| III | 22.3 | 1.13 | 9.6 | medium |

EXAMPLE IV 484 l hot water (70° C.) and 47,0 l NH$_4$OH (24,7%) was mixed, where after 224,0 kg lignin (UPM biopiva 100) was added slowly over 15 minutes at high agitation. Samples were taken out for analyses of un-dissolved lignin by use of a Hegman Scale and pH measurements.

This premixture was then transferred to a static mixer and a mixer/heat-exchanger, where the oxidation was made by use of H$_2$O$_2$ (35 vol.-%). Dosage of the premixture was 600 l/h and the H$_2$O$_2$ was dosed at 17,2 l/h. The dwell time in the mixer/heat-exchanger was 20 minutes.

The temperature of the mixture increased during the oxidation step up to 95° C.

The final product was analysed for the COOH group content, dry solid matter, pH, viscosity and remaining H$_2$O$_2$.

A binder was made based on this AOL: 49,3 g AOL (19,0% solids), 0,8 g primid XL552 (100% solids) and 2,4 g PEG200 (100% solids) were mixed with 0,8 g water to yield 19% solids; and then used for test of mechanical properties in bar tests.

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured at 200° C. The curing time was 1 hour. After cooling to room temperature, the bars were carefully taken out of the containers. Five of the bars were aged in a water bath at 80° C. for 3 hours.

After drying for 1 to 2 days, the aged bars as well as five unaged bars were broken in a 3 point bending test (test speed: 10.0 mm/min; rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The bars were placed with the "top face" up (i.e. the face with the dimensions length=5.6 cm, width=2.5 cm) in the machine.

| | AOL characteristica | | | Bar tests | |
|---|---|---|---|---|---|
| Sample name | solids, 200 C., 1 h, % | COOH (mmol/g solids) | Viscosity | initial strength (kN) | Aged strength (kN) |
| Ex IV | 17.7 | 1.69 | low | 0.28 | 0.11 |

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present disclosure is further described in the following referring to the accompanying drawings in which the figures show the following:

FIG. 8 shows different lignin precursors and common interunit linkages;

FIG. 10 shows a summary of the properties of the technical lignins.

Corresponding reference numerals indicate corresponding parts throughout the several views of the drawings.

DETAILED DESCRIPTION

Example embodiments will now be described more fully with reference to the accompanying drawings.

Figure 1:
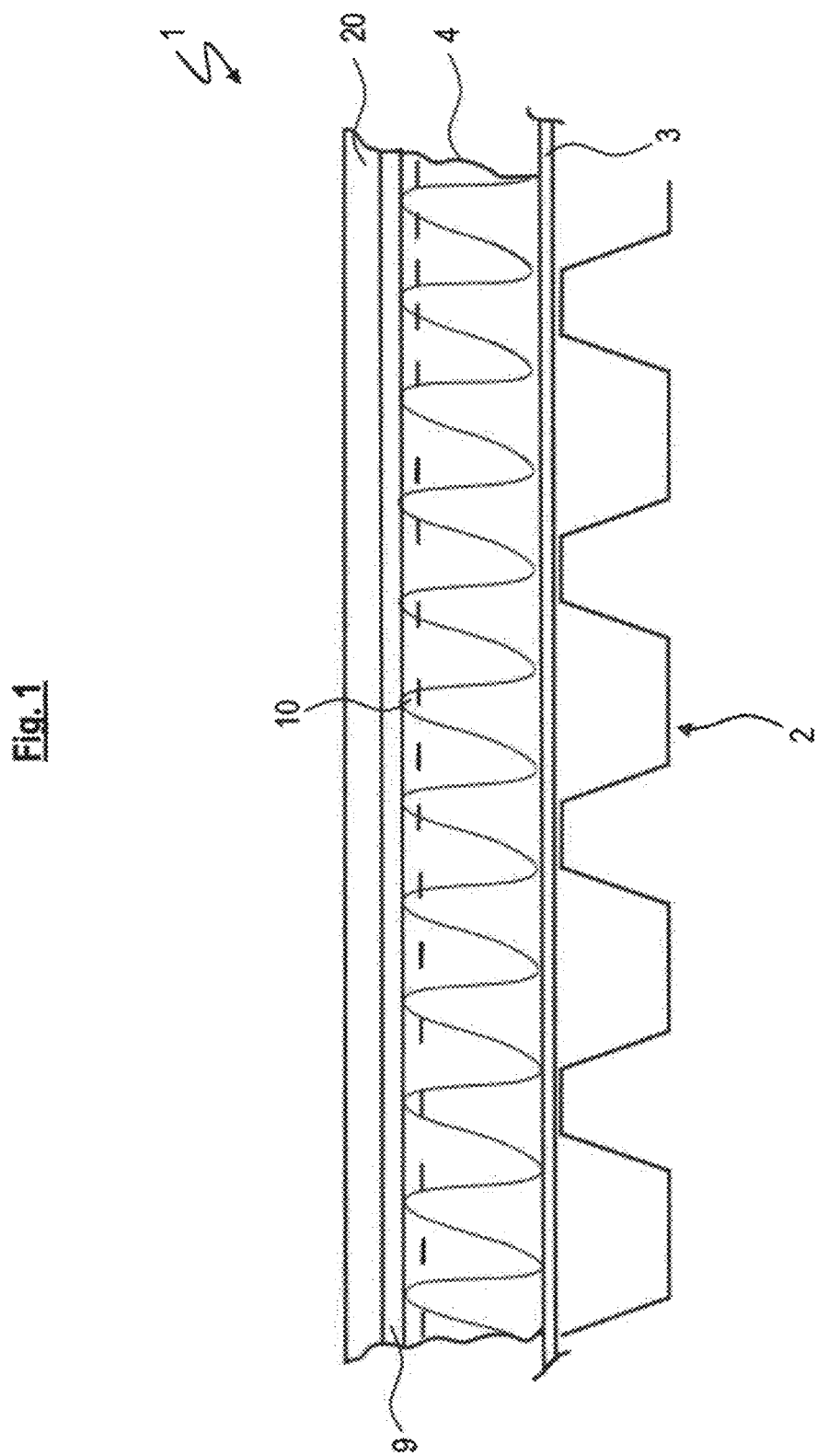
FIG. 1 shows a part of a first embodiment of a roofing system for a flat roof in cross-section.

FIG. 1 shows a first embodiment of a part of a flat roof 1 comprising a structural support 2, a vapour control layer 3, an insulation element 4 and an overlying waterproof membrane 20. The insulation element 4 is a bonded mineral fibre product made of mineral fibres and a binder.

The overlying waterproof membrane 20 is connected to the insulation element 4 via an adhesive 9 which can be an integral part of the membrane 20. The adhesive 9 can be a bituminous adhesive which is activated by a burner as usually used in roofing works, i.e. membrane 20 is torched onto the insulation element 4. A dotted line in the insulation element 4 indicates an area 10 into which molten bituminous adhesive 9 diffuses before hardening and connecting the membrane 20 to the insulation element 4.

Figure 2:
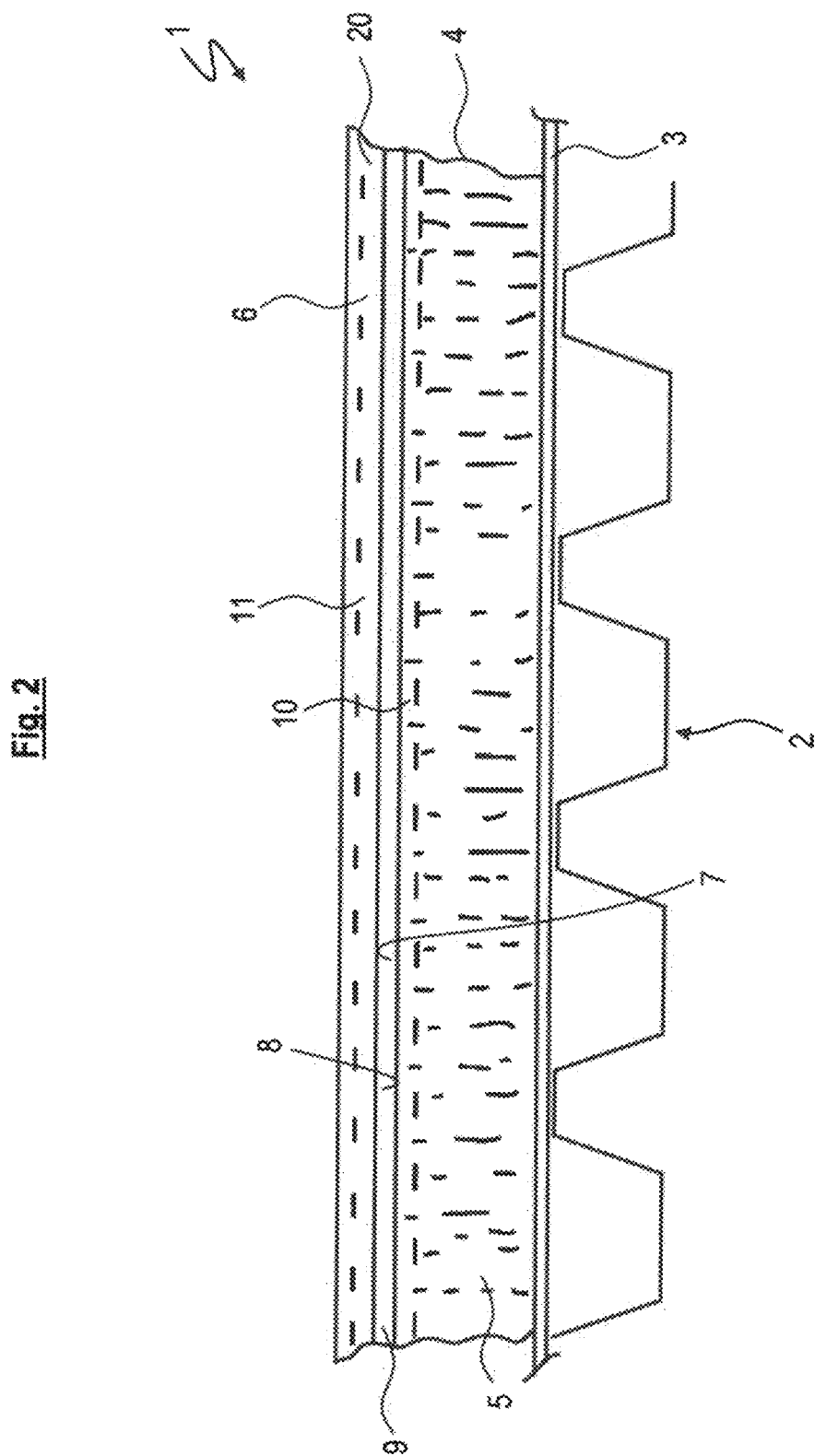
FIG. 2 shows a part of a second embodiment of a roofing system for a flat roof in cross-section.

FIG. 2 shows a second embodiment of a part of a flat roof 1 according to the disclosure comprising a structural support 2, a vapour control layer 3, an insulation element 4 and a waterproofing membrane (not shown but comparable to FIG. 1). The insulation element 4 comprises a first layer 5 comprising stone wool fibres and a binder and a second layer 6 made of a fabric of a glass fleece, having an E-modulus of 573 MPa. The tensile strength of the glass fleece is 71 N.

The first layer 5 is represented by one or more lamella having a fibre orientation predominantly perpendicular to a major surface 7 of the second layer 6. The lamella and therefore the first layer 5 have a density of 110 kg/m$^3$ and a typical thickness of 150 mm. The mineral fibres are bonded together via the binder being cured in a hardening oven before the second layer 6 is fixed to a surface 8 of the first layer 5 via an adhesive 9. The adhesive 9 in this special embodiment might be chosen from melamine urea formaldehyde, preferably as two-component glue, waterborne acrylic glue, phenol formaldehyde powder binder, waterborne neoprene foam glue, polyamide based powder glue, polyurethane glue, preferably as two-component glue, polyurethane moisture curing glue or sealing modified binder, preferably as one-component moisture curing glue. However, preferably the adhesive 9 in this special embodiment equals the binder composition utilized to bind the mineral fibres of the insulation element 4.

All these adhesives 9 build up a good connection to mineral fibres and all these adhesives 9 are able to build up nearly closed layers in the area of the lamella as well as in the area of the fabric thereby strengthening the insulation element 4 in a direction parallel to the major surfaces 7 of the lamellae.

The adhesive 9 is arranged partly in an area 10 close to the major surface 8 of the first layer 5 directed to the second layer 6 and in an area 11 close to the major surface 7 of the second layer 6 directed to the first layer 5 so that the adhesive 9 connects the first layer 5 and the second layer 6 in such a way that forces directed perpendicular to the second layer 6 can be compensated by the tensile strength of the second layer 6 in combination with the adhesive 9 and/or the deflection of the fibres of the first layer 5. Such a force of e.g. 80 kPa directed perpendicular to the second layer 6 causes a limited deformation of smaller 5% of the insulation element 4 (first and second layer 5, 6) and therefore of not more than 7,5 mm related to the thickness of 150 mm of the first layer 5. The thickness of the second layer 6 is approximately not more than 1 mm and can therefore be disregarded in this calculation. A sufficient amount of adhesive 9 is arranged between the fibres of the first layer 5 thereby surrounding the fibres and building up a layer of adhesive 9 being anchored in the first layer 5.

The adhesive 9 is arranged with an amount of 80 g/m$^2$ of liquid adhesive between the two layers 5 and 6 as an acrylic glue. A sufficient amount of the adhesive 9 diffuses in the first layer 5 and the second layer 6. The adhesive 9 constitutes therefore a layer connecting the first layer 5 and the second layer 6 and is anchored in both layers 5, 6.

Figure 3:
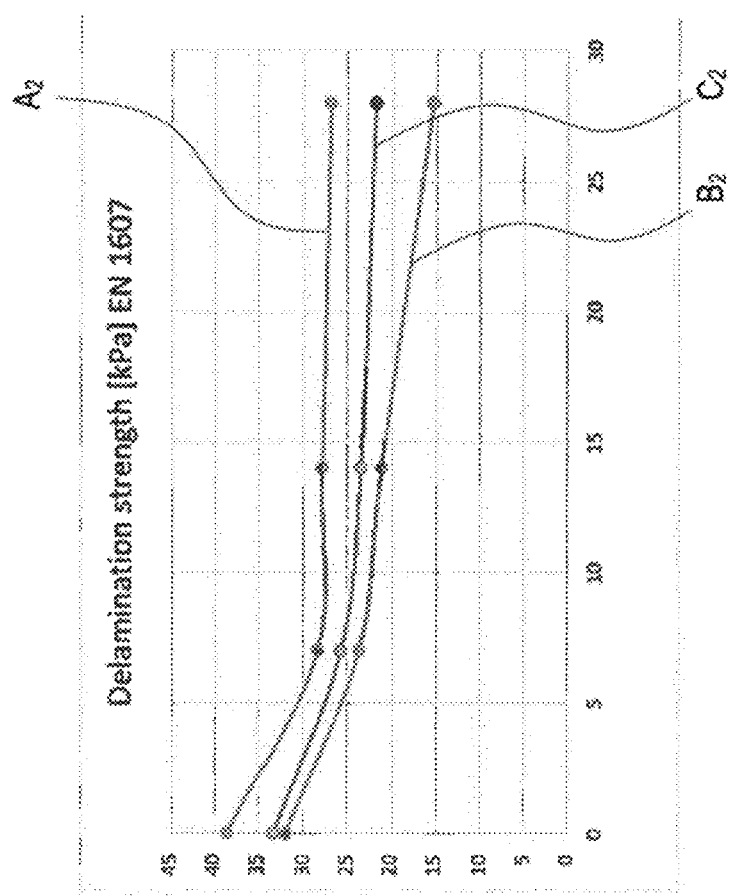
FIG. 3 shows a diagram showing the delamination strength of an insulation element used in a roofing system compared to the delamination strength of an insulation element according to the prior art.

The binder used in the insulation element 4 comprises a first component in form of one or more ammonia-oxidized lignins. The diagram according to FIG. 3 shows absolute values of the delamination strength of an insulation element 4 according to the disclosure (graph $C_2$) compared with the delamination strength of an insulation element containing one of the assignees prior art non-added formaldehyde binder shown in graph $A_2$ and the delamination strength of an insulation element containing traditional phenol-urea-formaldehyde binder shown in graph $B_2$.

The delamination strength is measured according to EN 1607:2013 and the first initial measurement is carried out on unaged samples immediately or shortly after production of the insulation element 4. This initial testing and the respective average result of a representative number of samples is illustrated at time '0' on the x-axis of the diagram. Said time '0' corresponds with day '0' respectively the start of the accelerated ageing test according to the following description below.

In order to determine the ageing resistance of mineral fibre products exposed to moisture and heating during the service life of constructions, such mineral fibre products with focus on mechanical properties are subjected to accelerated ageing. The ageing resistance is defined as the ability of the product to maintain the original mechanical properties, and it is calculated as the aged strength in percent of the original strength. The test procedure follows the so called Nordtest method NT Build 434: 1995.05, extended to 28 days.

The aim of said method is to expose insulation materials to accelerated ageing due to increased temperature and heat. It is applicable to all insulation materials manufactured as insulation boards. The method is not predictive i.e. it is not intended for assessment of the service life, but it is a precondition for a satisfactory performance that ageing due to this method does not cause major changes in the properties of the materials under investigation. Experiences over more than two decades with the Nordtest method have proven to deliver reliable data to ensure satisfactory mechanical performance of inter alia mineral fibre products as insulation elements for use in roofing systems.

According to the method, a representative number of test specimens are exposed to heat-moisture action for 7, 14 and 28 days at 70±2° C. and 95±5% relative humidity (RH) in a climatic chamber. Subsequently, the specimens are placed at 23±2° C. and 50±5% RH for at least 24 hours and upon drying are prepared for testing of mechanical performance, like e.g. the delamination strength is measured according to EN 1607:2013, or compression strength according to EN 826:2013 as will be described further below.

The relative ageing resistance is then calculated in % of and based on the initial absolute value measured at time '0'. Results are documented and illustrated for 7, 14 and 28 days of accelerated ageing.

With respect to the FIGS. 3 to 6 and examples given here, the insulation element 4 is a bonded mineral fibre roof product, commercially available at the assignee or affiliated companies which has been produced with the different binder types mentioned and tested for its mechanical properties. The product in question provides a target density of around 145 kg/m³ and a loss on ignition (LOI) of approx. 3,8 wt.-%.

The following Table I shows the delamination strength [kPa] EN 1607 according to FIG. 3.

TABLE I

|  | 0 days | 7 days | 14 days | 28 days |
|---|---|---|---|---|
| $A_2$ | 38.6 | 28.4 | 27.9 | 26.9 |
| $B_2$ | 32.1 | 23.7 | 21.1 | 15.3 |
| $C_2$ | 33.4 | 25.7 | 23.5 | 21.8 |

Table I shows the absolute delamination strength of the insulation element 4 according to the disclosure ($C_2$) compared to an insulation element containing a phenol-formaldehyde binder ($A_2$) and to an insulation element containing a non-added formaldehyde binder ($B_2$). The corresponding graphs are shown in FIG. 3.

Figure 4:
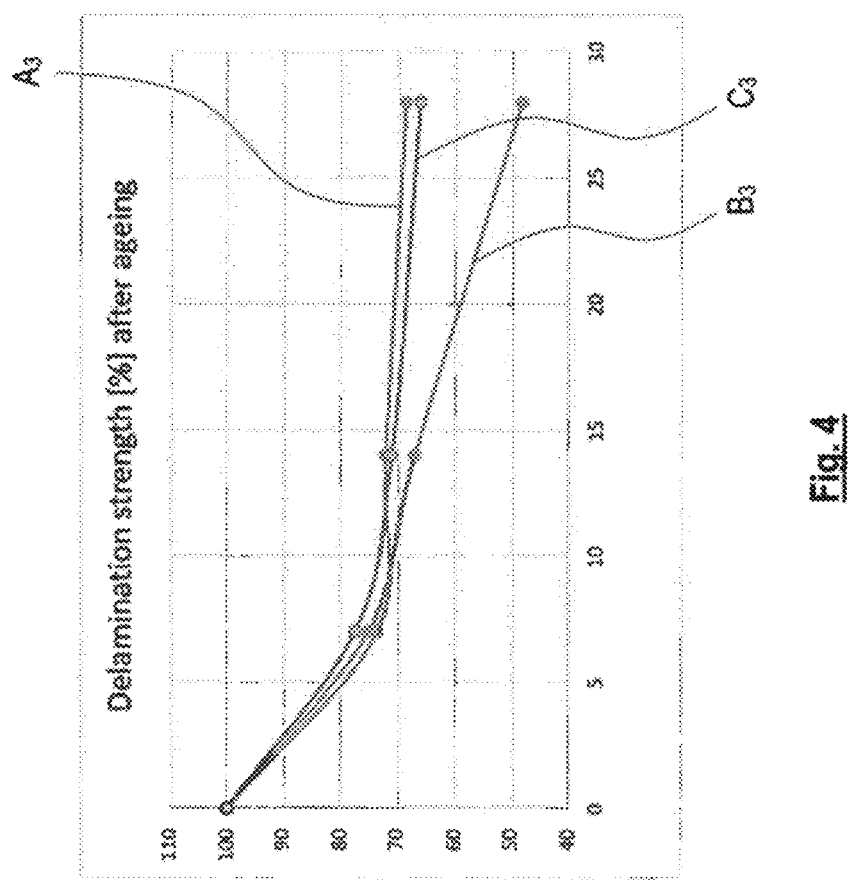
FIG. 4 shows a diagram showing the delamination strength of an insulation element used in a roofing system after ageing compared to the delamination strength of an insulation element according to the prior art after ageing.

The following Table II shows the relative delamination strength according to table I in % of initial according to FIG. 4.

TABLE II

|  | 0 days | 7 days | 14 days | 28 days |
|---|---|---|---|---|
| $A_3$ | 100.0 | 73.6 | 72.1 | 68.7 |
| $B_3$ | 100.0 | 75.2 | 67.1 | 48.3 |
| $C_3$ | 100.0 | 77.5 | 71.1 | 66.2 |

Table I shows the relative delamination strength of the insulation element 4 according to the disclosure ($C_3$) compared to an insulation element containing a phenol-formaldehyde binder ($A_3$) and to an insulation element containing a non-added formaldehyde binder ($B_3$). The corresponding graphs are shown in FIG. 4.

In Tables I and II it can be seen that the delamination strength of the insulation element 4 according to the disclosure is very close to the delamination strength of the insulation element containing a phenol-formaldehyde binder. Furthermore, it can be seen that the loss of delamination strength of the insulation element containing a non-added formaldehyde binder increases much more than the delamination strength of the insulation element 4 according to the disclosure. Furthermore, the delamination strength of the insulation element 4 according to the disclosure is very close to the delamination strength of the insulation element containing a phenol-formaldehyde binder. From FIGS. 3 and 4 it can be seen that the graphs $C_2/C_3$ and $A_2/A_3$ are approximately parallel to each other.

From Table II and FIG. 4 the relative delamination strength of the insulation element 4 according to the disclosure (graph $C_3$) compared to insulation elements containing a phenol-formaldehyde binder (graph $A_3$) or insulation elements containing a non-added formaldehyde binder (graph $B_3$). All insulation elements 4 to be compared were exposed to an ageing process according the before standing description.

Furthermore, it can be seen from Table II and from FIG. 4, that the values of delamination of the insulation element 4 according to the disclosure are approximately equal to the values of delamination of the insulation element containing phenol-formaldehyde binder $A_3$.

Figure 5:
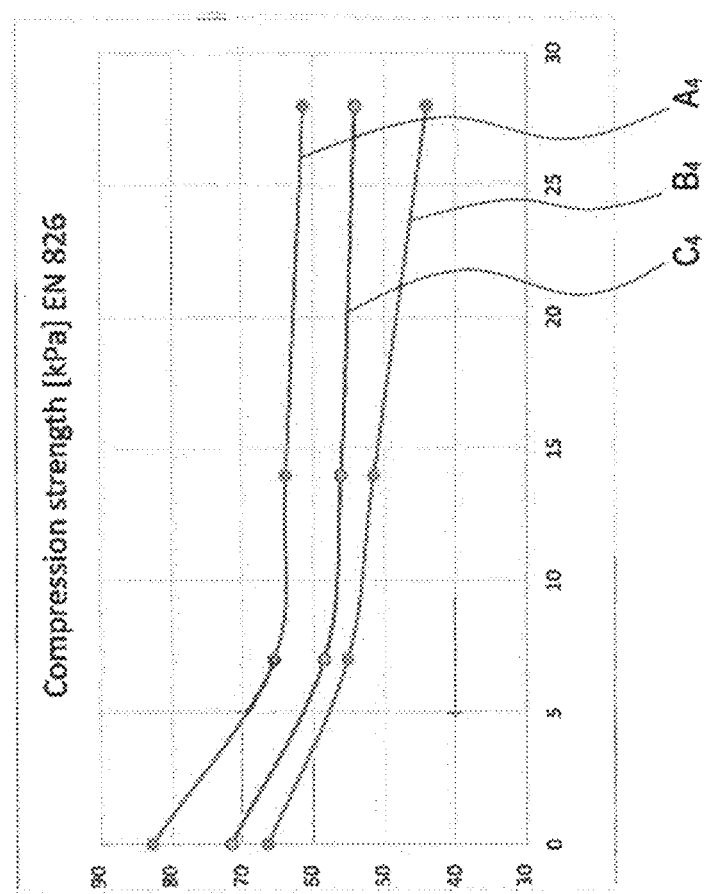
FIG. 5 shows a diagram showing the compression strength of an insulation element used in a roofing system compared to the compression strength of an insulation element according to the prior art.

The following Table III shows the absolute compression strength [kPa] EN 826 according to FIG. 5.

TABLE III

|  | 0 days | 7 days | 14 days | 28 days |
|---|---|---|---|---|
| $A_4$ | 82.6 | 65.5 | 63.9 | 61.3 |
| $B_4$ | 66.3 | 55.1 | 51.4 | 43.9 |
| $C_4$ | 71.5 | 58.5 | 56.1 | 54.0 |

Table III shows the absolute compression strength of the insulation element 4 according to the disclosure ($C_4$) compared to an insulation element containing a phenol-formaldehyde binder ($A_4$) and to an insulation element containing a non-added formaldehyde binder ($B_4$). The corresponding graphs are shown in FIG. 5.

FIG. 5 shows the compression strength of an insulation element 4 according to the disclosure (graph $C_4$) compared with the compression strength of an insulation element containing mineral fibres and a non-added formaldehyde binder shown in graph $B_4$ and the compression strength of an insulation element containing mineral fibres and a phenol-formaldehyde binder shown in graph $A_4$.

The compression strength is measured according to EN 826 and it can be seen, that the compression strength is measured immediately after production of the insulation element 4, and seven, fourteen and twenty-eight days after production of the insulation element 4.

Whereas the compression strength of the insulation element 4 according to the disclosure is very close to the compression strength of the insulation element containing a phenol-formaldehyde binder ($A_4$) it can be seen that the loss of compression strength of the insulation element containing a non-added formaldehyde binder ($B_4$) increases much more than the compression strength of the insulation element 4 according to the disclosure. Furthermore, the compression strength of the insulation element 4 according to the disclosure is very close to the compression strength of the insulation element containing a phenol-formaldehyde binder ($A_4$). It can be seen that the graphs $C_2$ and $A_2$ are approximately parallel to each other.

Figure 6:
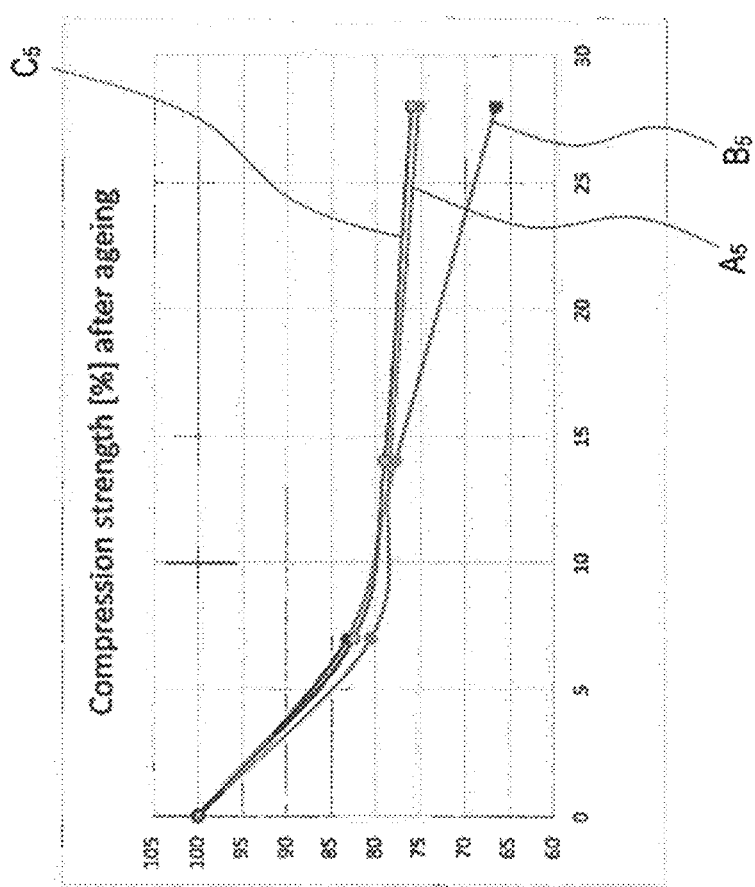
FIG. 6 shows a diagram showing the compression strength of an insulation element used in a roofing system after ageing compared to the compression strength of an insulation element according to the prior art after ageing.
Figure 7:
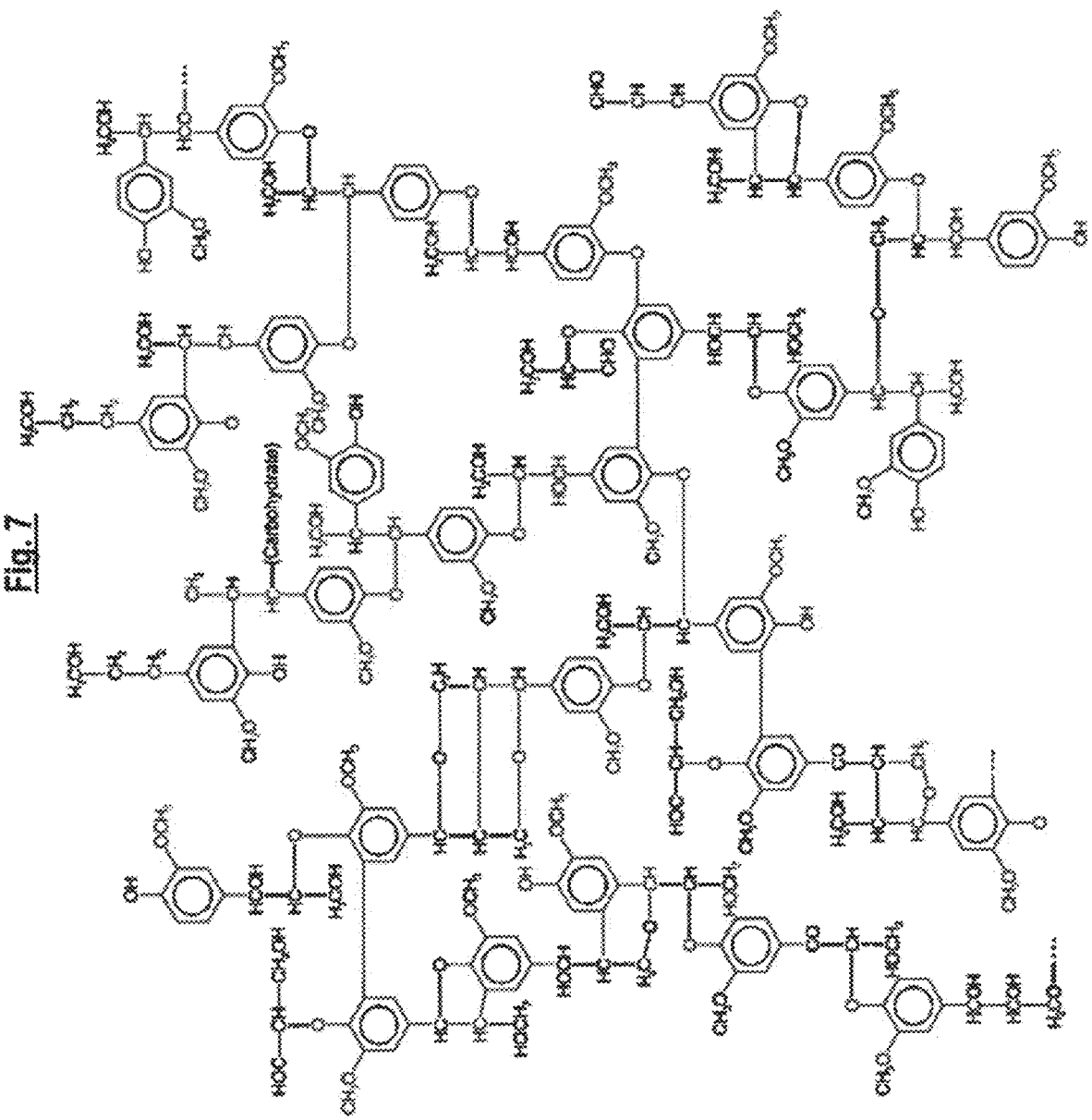
FIG. 7 shows a section from a possible lignin structure.
Figure 9:
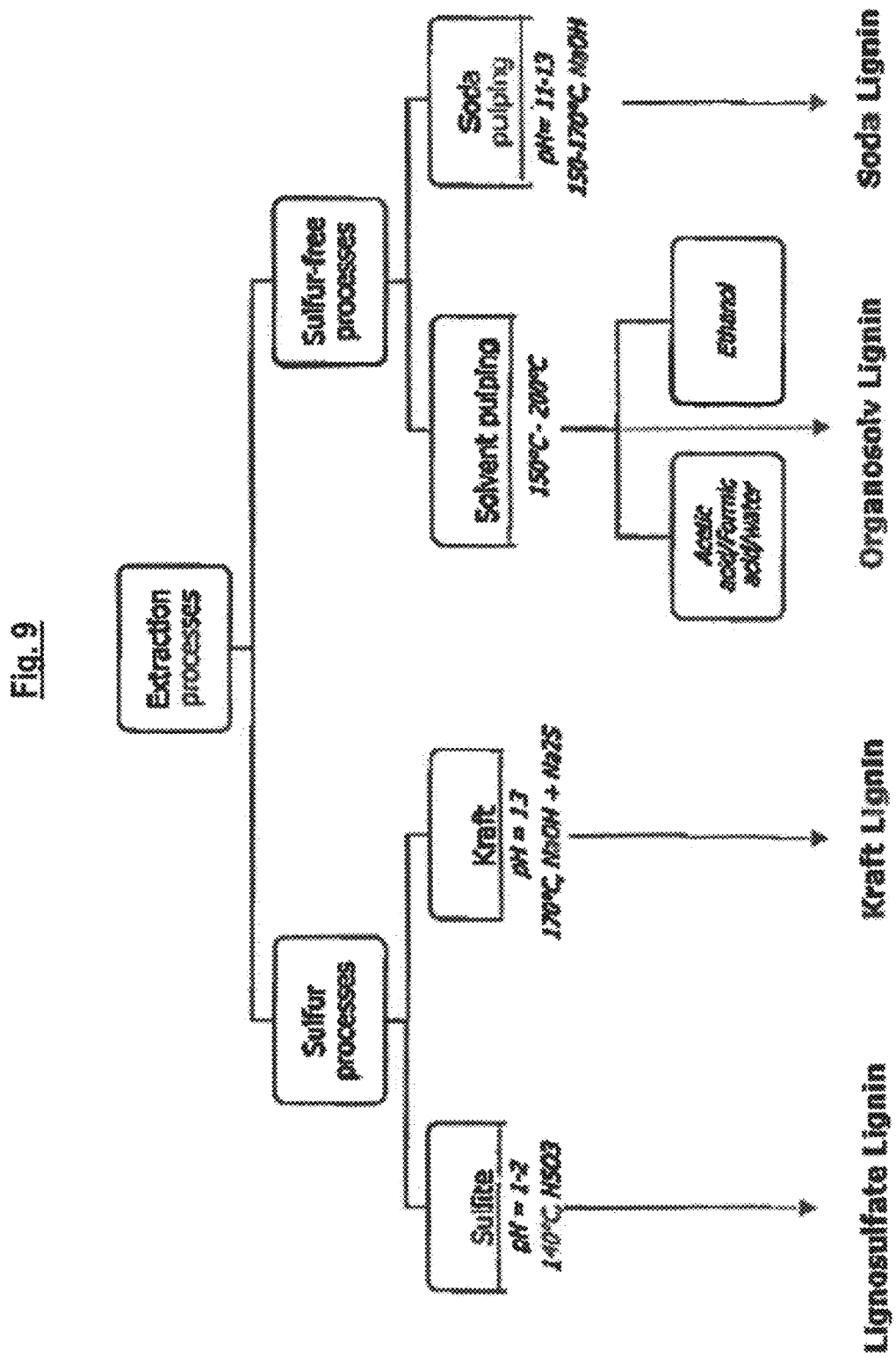
FIG. 9 shows four groups of technical lignins available in the market.

The following Table IV shows the relative compression strength according to table III in % of initial according to FIG. 6.

TABLE IV

|  | 0 days | 7 days | 14 days | 28 days |
|---|---|---|---|---|
| $A_5$ | 100.0 | 80.5 | 78.5 | 75.2 |
| $B_5$ | 100.0 | 83.2 | 77.8 | 66.6 |
| $C_5$ | 100.0 | 82.5 | 79.0 | 76.1 |

Table IV shows the relative compression strength of the insulation element 4 according to the disclosure ($C_5$) compared to an insulation element containing a phenol-formaldehyde binder ($A_5$) and to an insulation element containing a non-added formaldehyde binder ($B_5$). The corresponding graphs are shown in FIG. 6.

From FIG. 6 the relative compression strength of the insulation element 4 according to the disclosure (graph $C_5$) compared to insulation elements containing a phenol-formaldehyde binder (graph $A_5$) or insulation elements containing a non-added formaldehyde binder (graph $B_5$). All insulation elements to be compared were exposed to an ageing process containing the steps as described before.

Furthermore, it can be seen from FIG. 6, that the values of compression strength of the insulation element 4 according to the disclosure are approximately equal to the values of compression strength of the insulation element containing phenol-formaldehyde binder.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

What is claimed is:

1. A roofing system for a flat roof or a flat inclined roof of a building with a thermal and/or acoustic insulation, consisting of a structural support, a deck, optionally a vapour control layer, a waterproof membrane and at least one insulation element being a bonded mineral fibre product made of mineral fibres, and a cured aqueous binder composition, whereby the aqueous binder composition prior to curing comprises a component (i) in form of one or more oxidized lignins, a component (ii) in form of one or more cross-linkers, a component (iii) in form of one or more plasticizers, and whereby the insulation element has a bulk density between 70 kg/m$^3$ and 250 kg/m$^3$.

2. The roofing system according to claim 1, whereby the insulation element has a loss on ignition (LOI) within the range of 2 to 8 wt.-%.

3. The roofing system according to claim 1, having insulation elements with a compression strength between 50 and 130 kPa measured in accordance with European Standard EN 826:2013.

4. The roofing system according to claim 1, having insulation elements with a delamination strength between 20 and 50 kPa measured in accordance with European Standard EN 1607:2013.

5. The roofing system according to claim 1, wherein component (i) is in form of one or more ammonia-oxidized lignins (AOL's).

6. The roofing system according to claim 1, wherein the component (ii) comprises one or more cross-linkers selected from β-hydroxyalkylamide-cross-linkers and/or oxazoline-cross-linkers.

7. The roofing system according to claim 1, wherein the component (ii) comprises
   one or more cross-linkers selected from the group consisting of polyethylene imine, polyvinyl amine, fatty amines; and/or
   one more cross-linkers in form of fatty amides; and/or
   one or more cross-linkers selected from the group consisting of dimethoxyethanal, glycolaldehyde, glyoxalic acid; and/or
   one or more cross-linkers selected from polyester polyols; and/or
   one or more cross-linkers selected from the group consisting of starch, modified starch, CMC; and/or
   one or more cross-linkers in form of aliphatic multifunctional carbodiimides; and/or
   one or more cross-linkers selected from melamine based cross-linkers.

8. The roofing system according to claim 1, comprising component (ii) in an amount of 1 to 40 wt.-%, based on the dry weight of component (i).

9. The roofing system according to claim 1, wherein component (iii) comprises one or more plasticizers selected from the group consisting of polyethylene glycols, polyethylene glycol ethers, polyethers, hydrogenated sugars, phthalates and/or acids, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

10. The roofing system according to claim 1, wherein component (iii) comprises
    one or more plasticizers selected from the group consisting of fatty alcohols, monohydroxy alcohols; and/or
    one or more plasticizers selected from the group consisting of alkoxylates; and/or
    one or more plasticizers in form of propylene glycols; and/or
    one or more plasticizers in form of glycol esters; and/or
    one or more plasticizers selected from the group consisting of adipates, acetates, benzoates, cyclobenzoates, citrates, stearates, sorbates, sebacates, azelates, butyrates, valerates; and/or
    one or more plasticizers selected from the group consisting of phenol derivatives; and/or
    one or more plasticizers selected from the group consisting of silanols, siloxanes; and/or
    one or more plasticizers selected from the group consisting of sulfates, sulfonates and/or
    phosphates; and/or
    one or more plasticizers in form of hydroxy acids; and/or
    one or more plasticizers selected from the group consisting of monomeric amides, benzamide, fatty acid amides; and/or
    one or more plasticizers selected from the group consisting of quaternary ammonium compounds; and/or
    one or more plasticizers selected from the group consisting of vegetable oils; and/or
    one or more plasticizers selected from the group consisting of hydrogenated oils, acetylated oils; and/or
    one or more plasticizers selected from acid methyl esters; and/or
    one or more plasticizers selected from the group consisting of alkyl polyglucosides, gluconamides, aminoglucoseamides, sucrose esters, sorbitan esters; and/or
    one or more plasticizers selected from the group consisting of polyethylene glycols, polyethylene glycol ethers.

11. The roofing system according to claim 1, wherein the component (iii) is present in an amount of 0.5 to 50, based on the dry weight of component (i).

12. The roofing system according to claim 1, comprising a further component (iv) in form of one or more coupling agents in the binder.

13. The roofing system according to claim 1, further comprising a component (v) in form of one or more components selected from the group of ammonia, amines or any salts thereof in the binder.

14. The roofing system according to claim 1, comprising a further component in form of urea in the binder, in particular in an amount 5 to 40 wt.-%, based on the dry weight of component (i).

15. The roofing system according to claim 1, whereby the binder consists essentially of
    a component (i) in form of one or more oxidized lignins;
    a component (ii) in form of one or more cross-linkers;

a component (iii) in form of one or more plasticizers;
a component (iv) in form of one or more coupling agents;
optionally a component in form of one or more compounds selected from the group of ammonia, amines or any salts thereof;
optionally a component in form of urea;
optionally a component in form of a more reactive or non-reactive silicones;
optionally a hydrocarbon oil;
optionally one or more surface active agents; water.

16. The roofing system according to claim 1, wherein the mineral fibres are stone wool fibres.

17. An insulation element for a roofing system for a flat roof or a flat inclined roof of a building with a thermal and/or acoustic insulation, the roofing system including a structural support, a deck, optionally a vapour control layer, a waterproof membrane, and at least one said insulation element, the insulation element comprising: mineral fibres and a cured aqueous binder composition, whereby the aqueous binder composition prior to curing comprises a component (i) in form of one or more oxidized lignins, a component (ii) in form of one or more cross-linkers, a component (iii) in form of one or more plasticizers and whereby the insulation element has a bulk density between 70 kg/m³ and 250 kg/m³.

18. The insulation element according to claim 17, wherein the mineral fibres are stone wool fibres.

19. An insulation element for a roofing system for a flat roof or a flat inclined roof of a building with a thermal and/or acoustic insulation, the roofing system including a structural support, a deck, optionally a vapour control layer, a waterproof membrane, and at least one said insulation element, the insulation element comprising: a first layer comprising stone wool fibres and a binder and a second layer made of a glass fleece having a tensile strength, whereby the second layer is fixed to a major surface of the first layer by an adhesive, whereby the first layer is made of at least one lamella having a fibre orientation predominantly perpendicular to major surfaces of the second layer, and whereby the first layer contains a cured binder, wherein
the adhesive is arranged partly in an area between fibres close to the major surface of the first layer directed to the second layer and in an area close to the major surface of the second layer directed to the first layer so that the adhesive connects the first layer and the second layer in such a way that forces directed perpendicular to the second layer can be compensated by the tensile strength of the second layer in combination with the adhesive and/or the deflection of the fibres of the first layer causing a maximum deformation of ≤5% of the thickness of the insulation element.

* * * * *